United States Patent
Miyasa et al.

(10) Patent No.: US 9,691,150 B2
(45) Date of Patent: Jun. 27, 2017

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Kazuhiro Miyasa, Yokohama (JP); Takuro Miyasato, Kyoto (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/613,464

(22) Filed: Feb. 4, 2015

(65) Prior Publication Data

US 2015/0228093 A1   Aug. 13, 2015

(30) Foreign Application Priority Data

Feb. 7, 2014  (JP) ................................ 2014-022779

(51) Int. Cl.
| | |
|---|---|
| *G06T 7/00* | (2006.01) |
| *G06T 11/60* | (2006.01) |
| *G06T 7/33* | (2017.01) |

(52) U.S. Cl.
CPC .............. *G06T 7/0028* (2013.01); *G06T 7/33* (2017.01); *G06T 11/60* (2013.01);
(Continued)

(58) Field of Classification Search
CPC . G06T 2207/10048; G06T 2207/10072; G06T 7/0028; G06T 2207/30101;
(Continued)

(56) References Cited

U.S. PATENT DOCUMENTS

| | | | |
|---|---|---|---|
| 7,778,686 B2* | 8/2010 | Vass ..................... | A61B 5/0456 600/424 |
| 7,996,060 B2* | 8/2011 | Trofimov ............... | A61B 5/042 345/630 |

(Continued)

FOREIGN PATENT DOCUMENTS

JP    2010088627 A    4/2010

OTHER PUBLICATIONS

Lee, et al., "Breast X-ray and MR image fusion using Finite Element Modeling", Proc. Workshop on Breast Image Analysis in conjunction with MICCAI 2011, ISBN: 978-87-981270-9-3, pp. 129-136, 2011.

(Continued)

*Primary Examiner* — Jingge Wu
(74) *Attorney, Agent, or Firm* — Carter, DeLuca, Farrell & Schmidt, LLP

(57) ABSTRACT

An image processing apparatus includes: an image obtaining unit configured to obtain a first image by imaging an object using a first imaging apparatus, a second image by imaging the object using a second imaging apparatus, a third image by imaging the object using an image capturing unit whose position is associated with the second imaging apparatus; and an alignment unit configured to align the object in the first image with the object in the second image so that observation information of the object in the first image matches observation information of the object in the third image.

24 Claims, 18 Drawing Sheets

(52) U.S. Cl.
CPC ........... *G06T 2207/10072* (2013.01); *G06T 2207/10088* (2013.01); *G06T 2207/30068* (2013.01)

(58) Field of Classification Search
CPC ......... G06T 2207/10088; G06T 3/0068; G06T 11/60; A61B 6/504; A61B 8/0891; H04N 13/0221
See application file for complete search history.

(56) References Cited

U.S. PATENT DOCUMENTS

| | | | | |
|---|---|---|---|---|
| 2007/0217672 | A1* | 9/2007 | Shannon | G06T 7/0006 382/152 |
| 2010/0061601 | A1* | 3/2010 | Abramoff | G06K 9/00617 382/117 |
| 2011/0069063 | A1* | 3/2011 | Liao | A61B 6/5235 345/419 |
| 2011/0216958 | A1* | 9/2011 | Satoh | G06T 7/0028 382/131 |
| 2011/0262015 | A1* | 10/2011 | Ishikawa | G06K 9/6206 382/128 |
| 2012/0321161 | A1* | 12/2012 | Ishikawa | G06T 19/00 382/131 |
| 2013/0004035 | A1* | 1/2013 | Chung-Ming | G06T 7/0028 382/128 |
| 2014/0037168 | A1* | 2/2014 | Ishikawa | A61B 5/055 382/130 |
| 2015/0049174 | A1* | 2/2015 | Lee | H04N 13/0221 348/50 |
| 2015/0104091 | A1* | 4/2015 | Miyasa | G06T 7/0032 382/131 |

OTHER PUBLICATIONS

Tanner, et al., "Breast Shapes on Real and Simulated Mammograms", Proc. Int. Workshop on Digital Mammography 2010 (IWDM 2010), LNCS 6136, pp. 540-547, 2010.

* cited by examiner

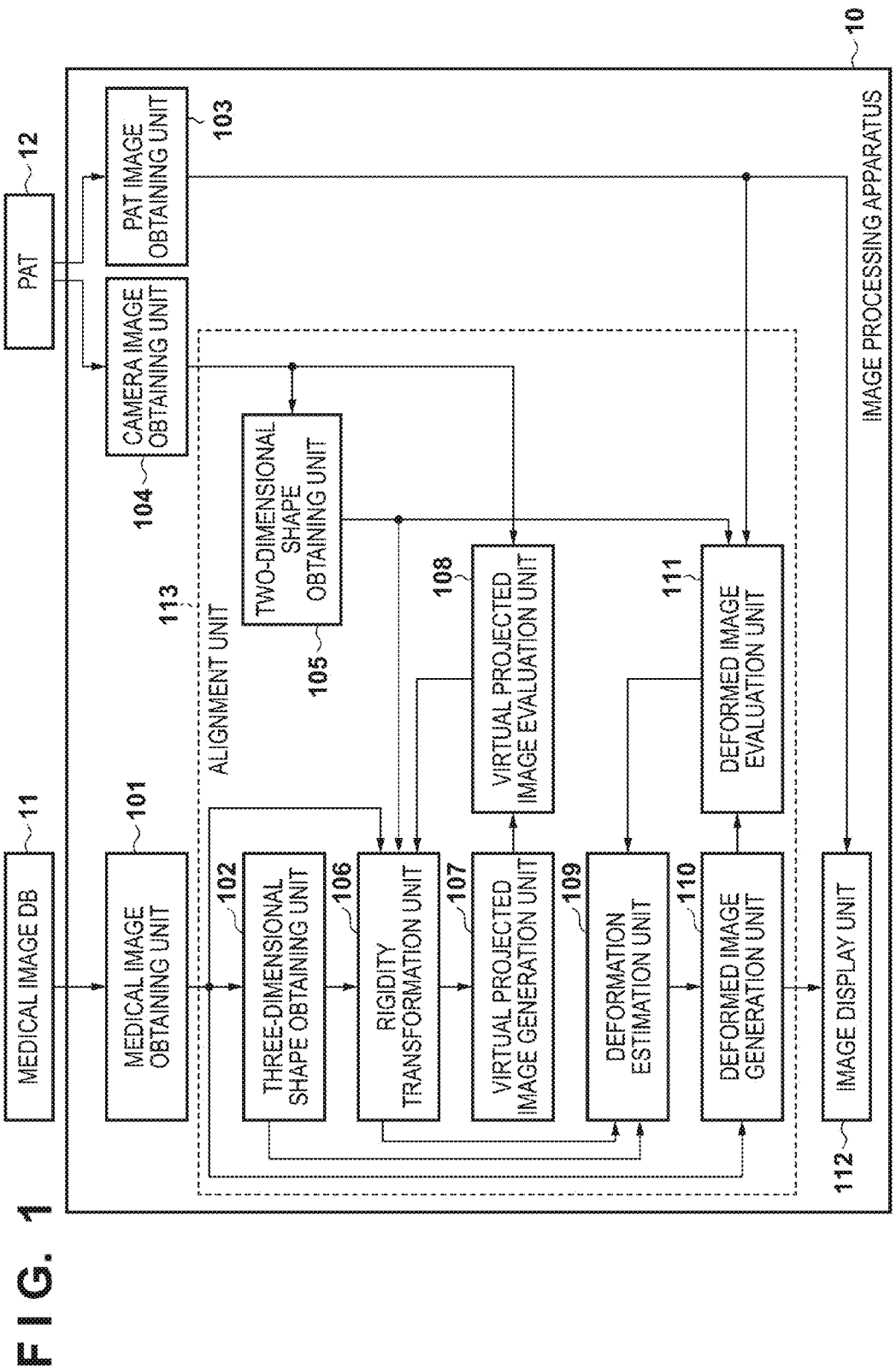

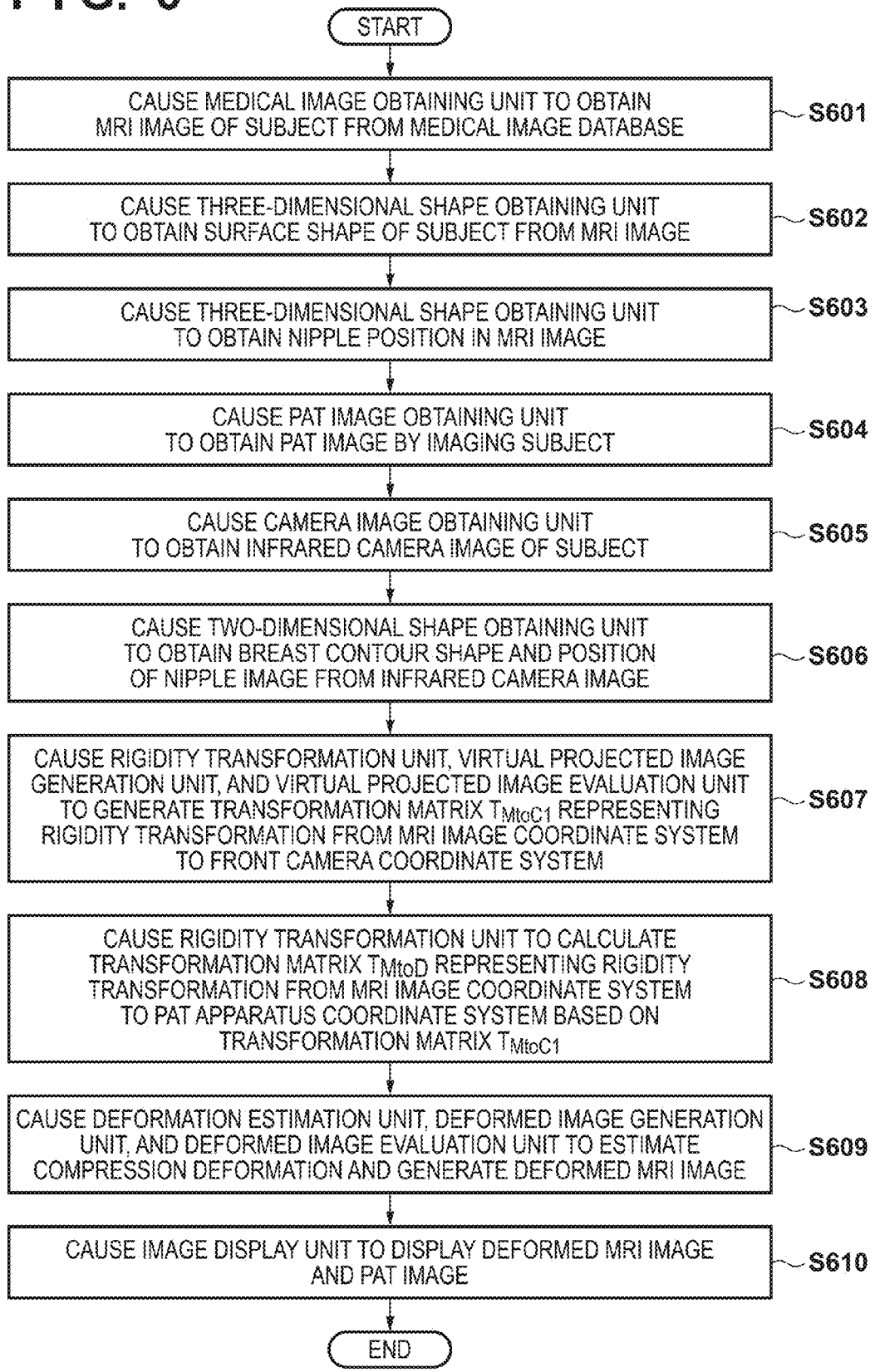

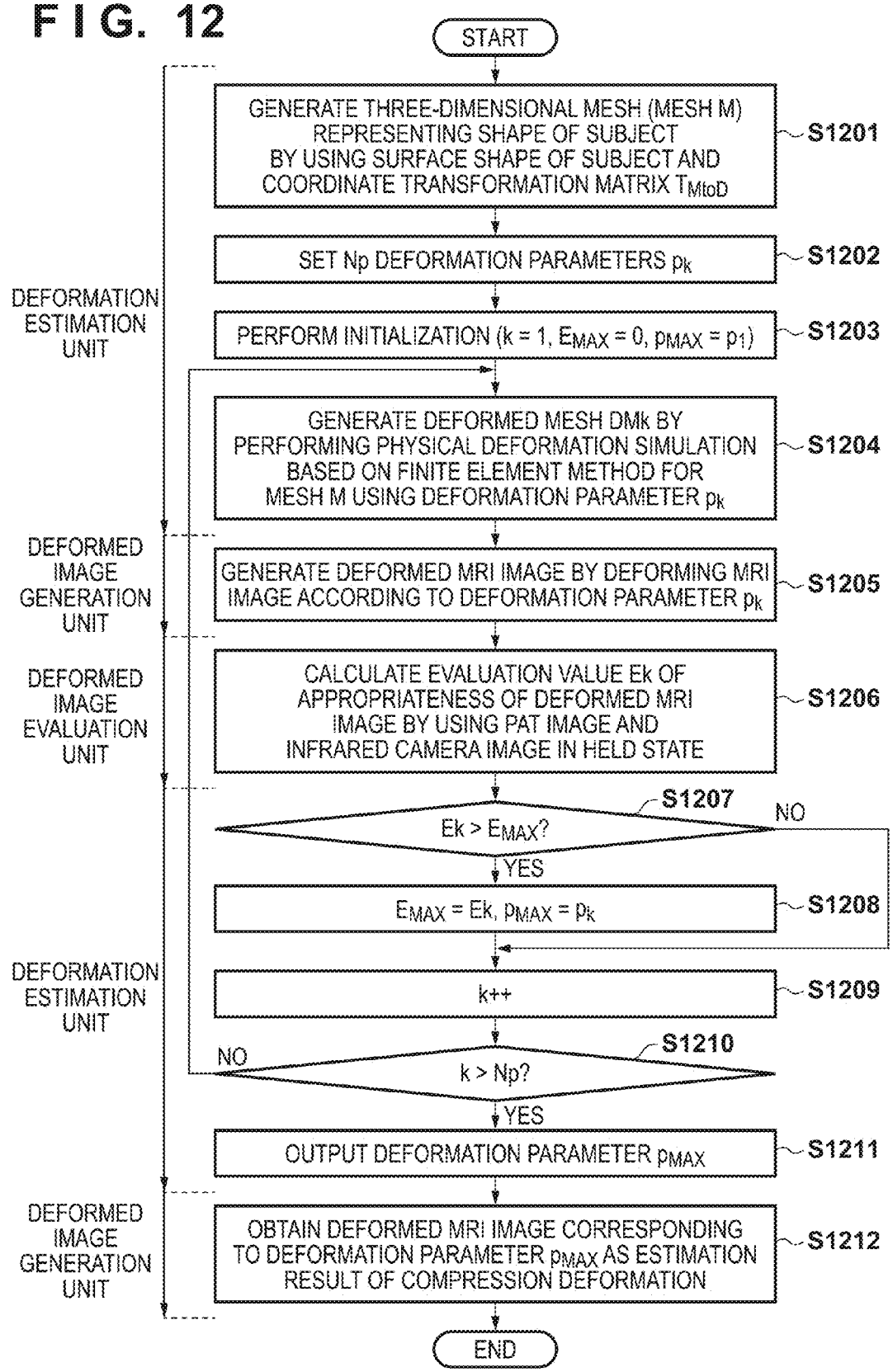

IMAGE PROCESSING APPARATUS, IMAGE PROCESSING METHOD AND STORAGE MEDIUM

BACKGROUND OF THE INVENTION

Field of the Invention

The present invention relates to an image processing apparatus, an image processing method and a storage medium and, more particularly, to an image processing technique for medical images captured by various medical imaging apparatuses (modalities).

Description of the Related Art

Japanese Patent Laid-Open No. 2010-88627 describes a PAT (Photoacoustic Tomography Apparatus) (to also be referred to as a PAT apparatus hereinafter) as a kind of medical imaging apparatus. The PAT apparatus excites an absorbing substance in a subject by irradiating the subject with optical pulses, and detects a photoacoustic signal generated by the thermoelastic expansion of the absorbing substance, thereby imaging properties associated with the light absorption of the subject as a three-dimensional image (three-dimensional tomographic image). The PAT apparatus images the distribution of optical energy accumulation amounts (the distribution of optical energy absorption densities) in a subject with respect to irradiation light. In addition, based on this distribution, the PAT apparatus images the distribution of optical absorption coefficients of the subject concerning an irradiation wavelength. In addition, it is possible to image the states (for example, oxygen saturation of hemoglobin) of substances constituting the subject based on the distribution of optical absorption coefficients concerning a plurality of wavelengths.

These images are expected to visualize information associated with new blood vessels generated inside and outside a malignant tumor such as a cancer. These images will be collectively referred to as PAT images (photoacoustic tomographic images) hereinafter.

A PAT apparatus irradiates a human body with near-infrared pulses of low energy, and hence has difficulty in imaging a deep portion of the human body as compared with X-rays or the like. As a form of a PAT apparatus designed to measure breasts, the PAT apparatus described in Japanese Patent Laid-Open No. 2010-88627 images a breast while holding the breast by two flat plates (to be referred to as holding plates hereinafter) to reduce the thickness of the breast. Therefore, when performing a diagnosis using both the PAT apparatus and another medical imaging apparatus such as an MRI (Magnetic Resonance Imaging) apparatus, a doctor can efficiently perform the diagnosis by performing deformation alignment (deforming one image to conform to the other image) in consideration of compression deformation caused by holding the breast.

A method of aligning a PAT image with an MRI image includes an image matching method. For example, non-patent literature 1 (Angela Lee, et al., "Breast X-ray and MR image fusion using finite element modeling", Proc. Workshop on Breast Image Analysis in conjunction with MICCAI 2011, pp. 129-136, 2011) describes a technique for alignment between an X-ray mammography (MMG) image obtained by imaging a breast compressed by flat plates and an MRI image of the breast. More specifically, a deformed MRI image is generated by performing, for an MRI image, a physical deformation simulation by compression with flat plates, a pseudo-MMG image is generated from the deformed MRI image, and alignment is performed by matching between the pseudo-MMG image and the actually captured MMG image.

In addition, non-patent literature 2 (C. Tanner, et al., "Breast Shapes on Real and Simulated Mammograms", Proc. Int. Workshop on Digital Mammography 2010 (IWDM 2010), LNCS 6136, pp. 540-547, 2010) discloses a technique of evaluating, based on the two-dimensional shape of a breast which is extracted from an MMG image, the shape of the breast after deformation which is obtained as a result of performing, for an MRI image, a physical deformation simulation by compression with flat plates.

However, since an image obtained by a medical imaging apparatus (for example, a PAT apparatus) and an image obtained by another medical imaging apparatus (for example, an MRI apparatus) differ in their characteristics to be imaged, not all the structures depicted in the first image (MRI image) match those on the second image (PAT image). Therefore, even if the technique described in non-patent literature 1 is used for alignment between the second image (PAT image) and the first image (MRI image), it is difficult to execute accurate alignment by performing only image matching. On the other hand, since the second image (PAT image) does not include sufficient outer shape information of a subject, it is difficult to directly use the technique described in non-patent literature 2.

The present invention provides a technique of accurately aligning a first image (three-dimensional image (three-dimensional tomographic image)) such as an MRI image or CT image of a subject as an object with a second image (PAT image).

SUMMARY OF THE INVENTION

According to one aspect of the present invention, there is provided an image processing apparatus including: an image obtaining unit configured to obtain a first image by imaging an object using a first imaging apparatus, a second image by imaging the object using a second imaging apparatus, a third image by imaging the object using an image capturing unit whose position is associated with the second imaging apparatus; and an alignment unit configured to align the object in the first image with the object in the second image so that observation information of the object in the first image matches observation information of the object in the third image.

According to the present invention, it is possible to accurately align a first image (three-dimensional image) such as an MRI image or CT image of a subject as an object with a second image (PAT image).

Further features of the present invention will become apparent from the following description of exemplary embodiments (with reference to the attached drawings).

BRIEF DESCRIPTION OF THE DRAWINGS

FIG. 1 is a block diagram showing an example of the arrangement of a modality system including an image processing apparatus according to the first embodiment;

FIG. 6 is a flowchart for explaining processing by the image processing apparatus according to the first embodiment;

FIG. 12 is a flowchart for explaining the details of estimation of compression deformation;

DESCRIPTION OF THE EMBODIMENTS

Figure 2A:
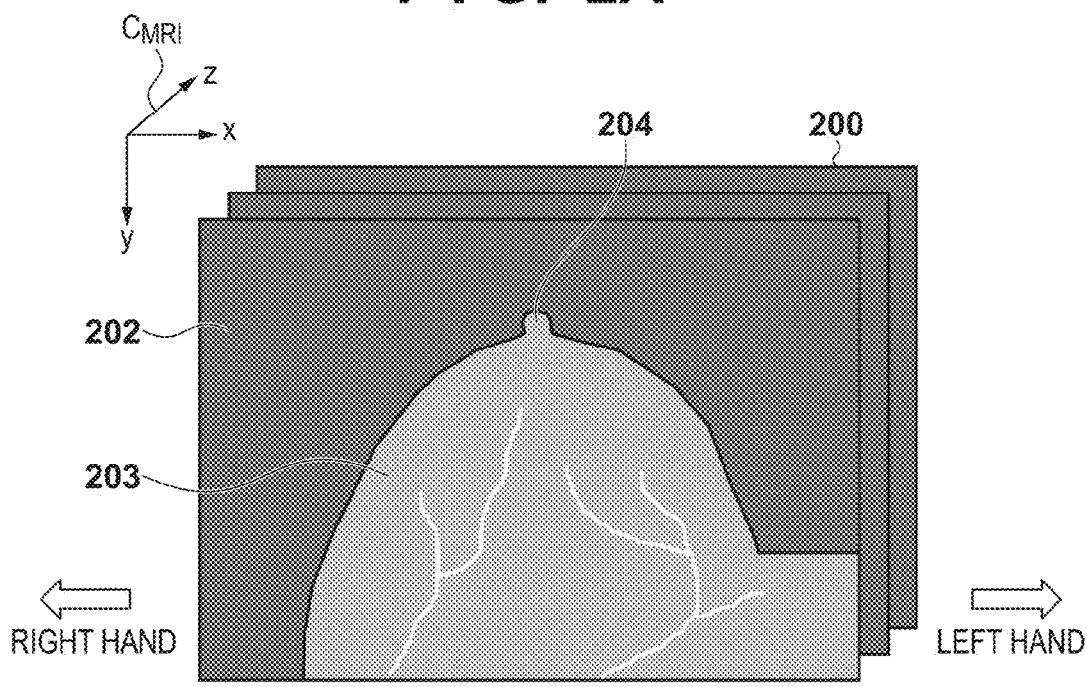
FIGS. 2A and 2B are views for explaining MRI images of a subject which are held in a medical image DB.

Embodiments of the present invention will be exemplarily described in detail below with reference to the accompanying drawings. Note that components to be described in these embodiments are merely examples. The technical scope of the present invention is defined by the scope of the claims, and is not limited by the following embodiments.

First Embodiment

An image processing apparatus 10 includes image obtaining units 101, 103, and 104, and an alignment unit 113. The image obtaining units 101, 103, and 104 respectively obtain the first image by imaging an object using the first imaging apparatus (for example, an MRI apparatus), the second image by imaging the object using the second imaging apparatus (for example, a PAT apparatus), and the third image by imaging the object using an image capturing unit whose position is associated with the second imaging apparatus.

The alignment unit 113 aligns the object in the first image with that in the second image so that the observation information of the object in the first image matches that of the object in the third image.

The image processing apparatus according to this embodiment performs deformation alignment of a PAT image and an MRI image by setting a breast as a subject, and comparing a PAT image and an image of an infrared camera mounted on a PAT (Photoacoustic Tomography Apparatus) with the MRI image. When the first state indicates the position and shape of the subject at the time of MRI imaging, and the second state indicates the position and shape of the subject at the time of PAT imaging, the image processing apparatus deforms an MRI image of the subject in the first state, and aligns the deformed MRI image with an image of the subject in the second state.

As practical processing, first of all, the image processing apparatus obtains a two-dimensional image by imaging a subject in an upheld state (to be referred to as an "early stage in the second state" hereinafter) before PAT imaging using an infrared camera mounted in the PAT. The image processing apparatus then aligns an MRI image with the two-dimensional image. That is, the image processing apparatus estimates rigid transformation between the subject in the first state and the subject in the second state (to be exact, an early stage in the second state) as an alignment parameter for the two subjects. By using the rigid transformation as an initial value, the image processing apparatus estimates a deformation parameter for compression deformation as an alignment parameter for the subject in the first state and the subject at the time of PAT imaging (that is, in the second state). The image processing apparatus derives an alignment parameter between the PAT image and the MRI image by the two-stage processing.

FIG. 1 is a block diagram showing an example of the arrangement of a modality system including the image processing apparatus 10 according to the first embodiment. The image obtaining units of the image processing apparatus 10 include the first image obtaining unit (for example, the medical image obtaining unit 101) which obtains the first image by imaging the object in the first state using the first imaging apparatus. The image obtaining units of the image processing apparatus 10 include the second image obtaining unit (for example, the PAT image obtaining unit 103) which obtains the second image by imaging the object in the second state different from the first state using the second imaging apparatus. The image obtaining units of the image processing apparatus 10 include the third image obtaining unit (for example, the camera image obtaining unit 104) which obtains the third image (infrared camera image) by imaging the object in an early stage in the second state using the image capturing unit (for example, the infrared camera).

After performing alignment so that the observation information of the object in the first image matches that of the object in the third image, the alignment unit 113 uses the alignment result to align the object in the first image with that in the second image by comparing the observation information of the object in the first image with that of the object in the second image. That is, after aligning the first image with the third image by comparing the first image with the third image, the alignment unit 113 uses the alignment result to align the first image with the second image by comparing the first image with the second image.

The image processing apparatus 10 is connected to a medical image DB (database) 11 and a PAT (Photoacoustic Tomography Apparatus) 12. The medical image DB 11 holds three-dimensional image data obtained by imaging in advance a subject by using an MRI apparatus. The PAT 12 is an apparatus which captures a PAT image, and holds a PAT image and an infrared camera image of a subject. Note that three-dimensional image data held in the medical image DB 11 is not limited to data obtained by imaging a subject by an MRI apparatus. Any three-dimensional image data to be compared with a PAT image may be used without limiting modalities. For example, an X-ray CT image obtained by imaging a subject using an X-ray CT apparatus may be used.

Alternatively, a PAT image obtained by imaging the subject in the past by using the same PAT apparatus is possible.

MRI images of a subject held in the medical image DB 11 will be described with reference to FIGS. 2A and 2B. An MRI image 200 of a subject shown in FIG. 2A is a set (three-dimensional image data) of two-dimensional images (slices containing a nipple 204) obtained by slicing the subject along slices (axial slices) perpendicular to the craniocaudal direction of the human body. The positions of pixels constituting the MRI image 200 are defined in an MRI image coordinate system $C_{MRI}$. In addition, the MRI image 200 includes the imaging results of an extracorporeal area 202 of the subject and an intracorporeal area 203 of the subject.

Figure 2B:
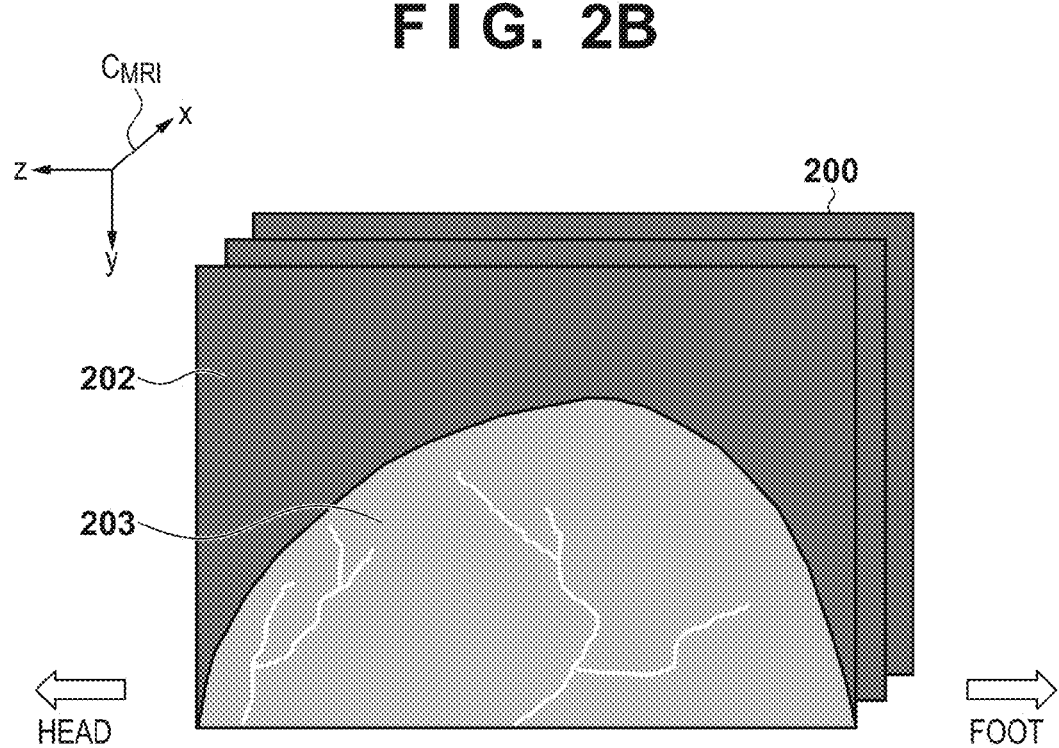

An MRI image 200 shown in FIG. 2B is a set (three-dimensional image data) of two-dimensional images obtained by slicing the subject along slices (sagittal slices) perpendicular to the transverse direction of the human body. Like the MRI image 200, the MRI image 200 includes the imaging results of the extracorporeal area 202 of the subject and the intracorporeal area 203 of the subject. Note that in this embodiment, the MRI image coordinate system $C_{MRI}$ is defined as a coordinate system in which the direction from the right-hand side to the left-hand side of a patient is the positive x-axis direction, the direction from the chest side to the back side is the positive y-axis direction, and the direction from the foot side to the head side is the positive z-axis direction.

Imaging of a subject by the PAT 12 will be described with reference to FIG. 3. A subject 300 is postured in the prone position on the bed on the upper surface of the PAT 12. One breast 301 as a subject is inserted into an opening portion 302 of the upper surface of the PAT 12. At this time, the breast 301 is held by two transparent holding plates (a fixed holding plate 303 on the foot side and a movable holding plate 304 on the head side) in a compressed state so as to allow irradiation light to reach the inside of the breast, and is imaged while the thickness of the breast 301 is reduced. The breast is held by moving the movable holding plate 304 toward the foot side (toward the fixed holding plate 303).

Assume that both the fixed holding plate 303 and the movable holding plate 304 are flat plates, and surfaces (to be referred to as "holding surfaces" hereinafter) which come into contact with the breast 301 are flat surfaces. In addition, the PAT 12 measures the distance (to be referred to as the "holding thickness" hereinafter) between the fixed holding plate 303 and the movable holding plate 304 when holding the breast 301, and the holding thickness is stored in the header portion of a PAT image as additional information of the image.

A light source (not shown) performs irradiation with near-infrared pulses as irradiation light from a direction perpendicular to the flat surfaces of the holding plates. An ultrasonic probe (not shown) arranged perpendicularly to the flat surfaces of the holding plates receives a photoacoustic signal generated in the subject.

A PAT apparatus coordinate system $C_{DEV}$ is defined for the PAT 12. The x-y plane is parallel to the flat surfaces of the fixed holding plate 303 and the movable holding plate 304, and the z-axis extends in the thickness (holding thickness) direction of the held breast 301. Similarly to the MRI image coordinate system $C_{MRI}$, the direction from the right-hand side to the left-hand side of the subject 300 is defined as the positive x-axis direction, the direction from the chest side (lower side) to the back side (upper side) is defined as the positive y-axis direction, and the direction from the foot side to the head side is defined as the positive z-axis direction. The origin of the PAT apparatus coordinate system $C_{DEV}$ is set at, for example, the lower end position on the right-hand side on the fixed holding plate 303. Assume that the PAT 12 will subsequently handle the relationship between the above coordinate system as a reference and another coordinate system.

Figure 4:
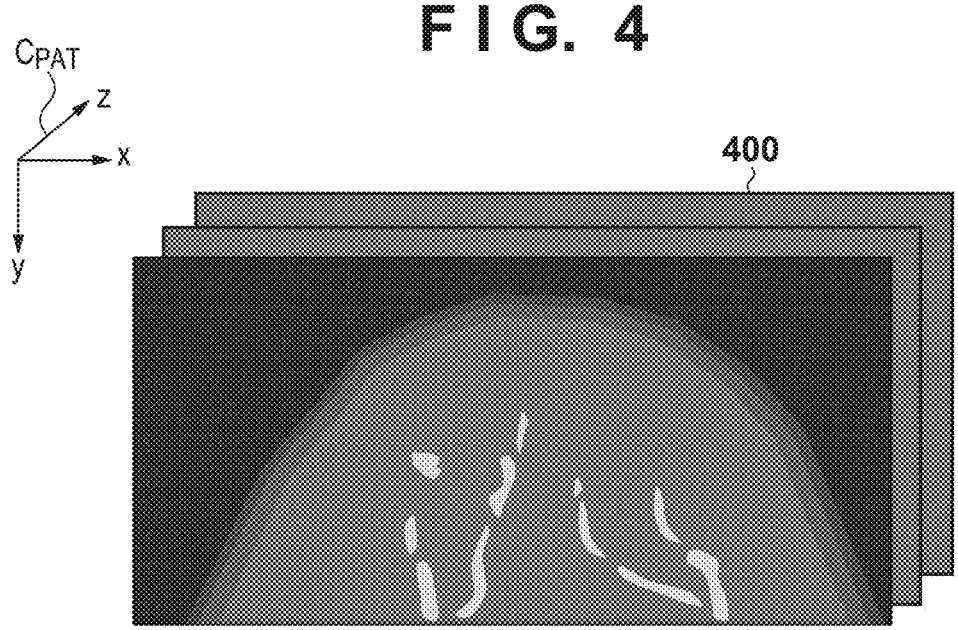
FIG. 4 is a view showing an example of a PAT image captured by the PAT.

FIG. 4 is a view for exemplarily explaining a PAT image captured by the PAT 12. A PAT image 400 is a set (three-dimensional image data) of two-dimensional images of axial slices, similarly to the MRI image shown in FIG. 2A. In this embodiment, like the MRI image coordinate system $C_{MRI}$, a PAT image coordinate system $C_{PAT}$ is defined as a coordinate system in which the direction from the right-hand side to the left-hand side of the subject 300 is the positive x-axis direction, the direction from the chest side to the back side is the positive y-axis direction, and the direction from the foot side to the head side is the positive z-axis direction.

A coordinate transformation matrix which performs transformation from the PAT image coordinate system $C_{PAT}$ to the PAT apparatus coordinate system $C_{DEV}$ is defined as "$T_{PtoD}$". Assume that all the coordinate transformation matrices appearing in the following description are 4×4 matrices each representing the translation and rotation of the coordinate system. The PAT image coordinate system $C_{PAT}$ is a parallel coordinate system obtained by translating the PAT apparatus coordinate system $C_{DEV}$, and the origin position of the PAT image coordinate system $C_{PAT}$ changes in accordance with the imaging range of the breast 301 as a subject. That is, the coordinate transformation matrix $T_{PtoD}$ includes no rotation component and can be uniquely calculated based on the imaging range. The coordinate transformation matrix $T_{PtoD}$ is stored in the header portion of the PAT image as additional information of the PAT image.

Figure 3:
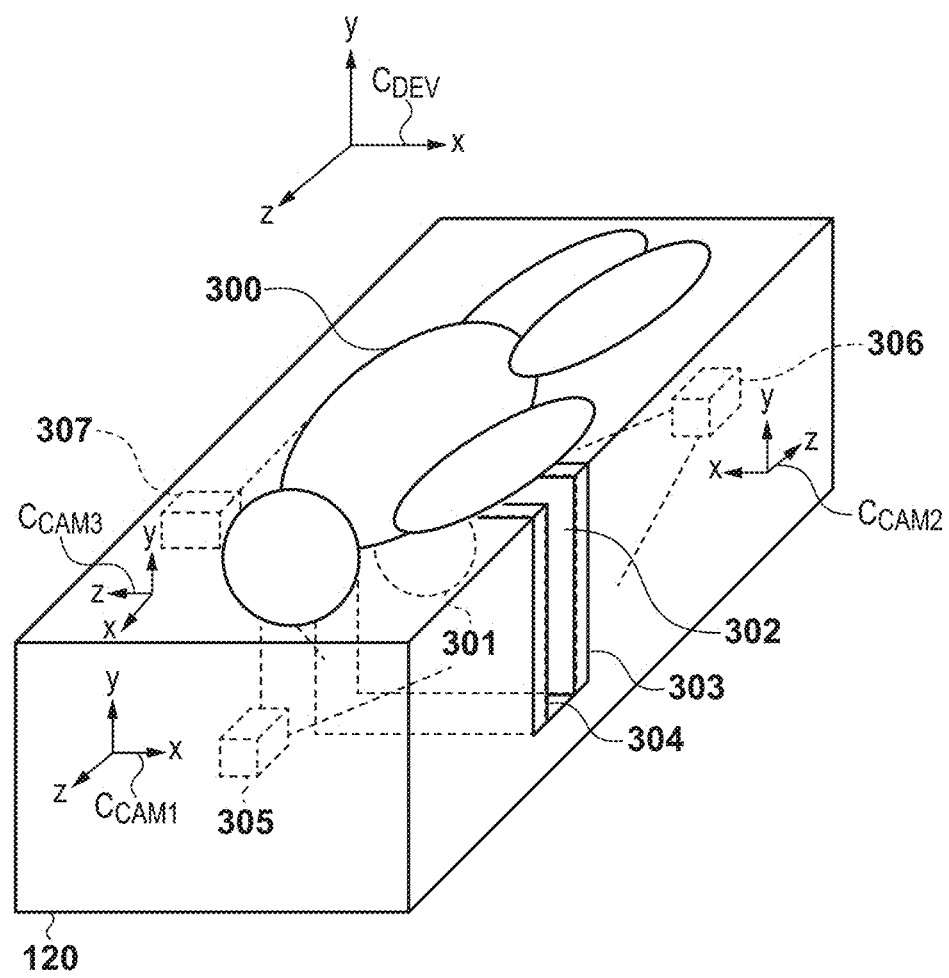
FIG. 3 is a view for explaining imaging of a subject by a PAT.

As shown in FIG. 3, the PAT 12 is equipped with three infrared cameras (a front infrared camera 305, a rear infrared camera 306, and a side infrared camera 307) for imaging the outer appearance of the breast 301 as a subject and the state of blood vessels near the body surface. The front infrared camera 305 is arranged at a position where it can image the outer appearance of the breast 301 from the head side through the movable holding plate 304. The rear infrared camera 306 is arranged at a position where it can image the outer appearance of the breast 301 as a subject from the foot side through the fixed holding plate 303. The side infrared camera 307 is arranged at a position where it can image the outer appearance of the breast 301 from a side surface.

The PAT 12 has a function of storing images of the breast 301 in a state (to be referred to as an "upheld state" hereinafter) in which the breast 301 as a subject is not held and in a state (to be referred to as a "held state" hereinafter) in which the breast 301 is held, which are captured by the front infrared camera 305, the rear infrared camera 306, and the side infrared camera 307.

In the following description, images captured by the front infrared camera 305, the rear infrared camera 306, and the side infrared camera 307 in a held state are respectively represented by $I_{CAM1}$, $I_{CAM2}$, and $I_{CAM3}$. In addition, images captured by the front infrared camera 305, the rear infrared camera 306, and the side infrared camera 307 in an upheld state are respectively represented by $I'_{CAM1}$, $I'_{CAM2}$, and $I'_{CAM3}$.

The z-axis (indicating the negative direction of a visual axis) of a coordinate system (a front camera coordinate system) $C_{CAM1}$ of the front infrared camera 305 is set in almost the same direction as that of the z-axis of the PAT apparatus coordinate system $C_{DEV}$. Likewise, the z-axis of a coordinate system (rear camera coordinate system) $C_{CAM2}$ of the rear infrared camera 306 is set in almost the opposite direction to the z-axis of the PAT apparatus coordinate system $C_{DEV}$. Also, the z-axis of a coordinate system (side camera coordinate system) $C_{CAM3}$ of the side infrared camera 307 is set in the −x-axis direction of the PAT apparatus coordinate system $C_{DEV}$.

Coordinate transformation matrices for transformation from the camera coordinate systems $C_{CAM1}$, $C_{CAM2}$, and $C_{CAM3}$ to the PAT apparatus coordinate system $C_{DEV}$ are respectively defined as $T_{C1toD}$, $T_{C2toD}$, and $T_{C3toD}$. The front infrared camera 305, the rear infrared camera 306, and the side infrared camera 307 have been calibrated in the PAT apparatus coordinate system $C_{DEV}$ (in other words, the positional relationships with the PAT 12 are associated with each other). The image processing apparatus 10 holds the above coordinate transformation matrices and internal parameters of the front infrared camera 305, the rear infrared camera 306, and the side infrared camera 307 as known information.

Figure 5:
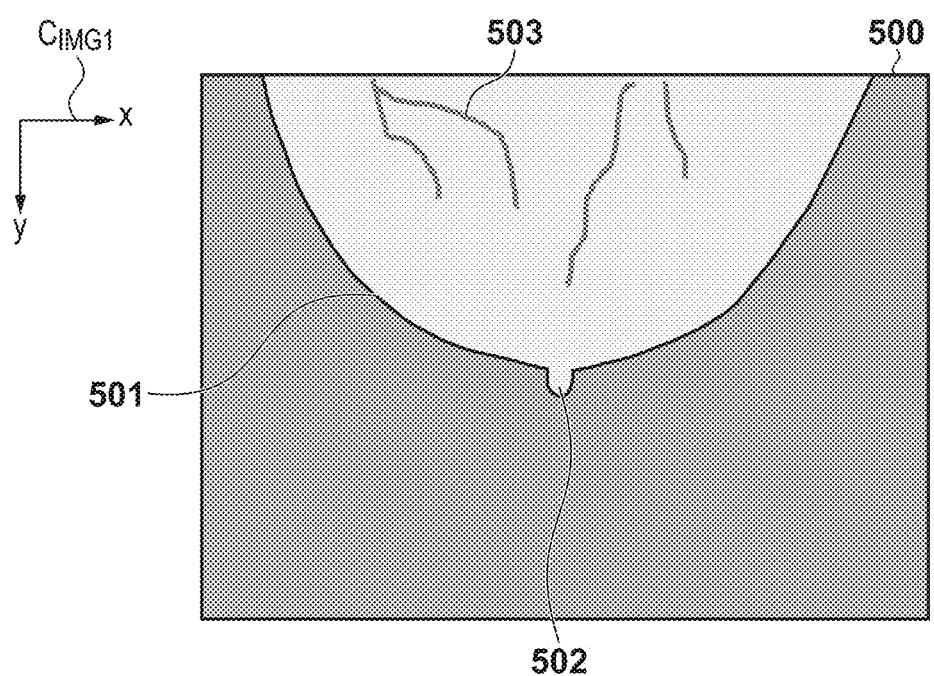
FIG. 5 is a view showing an example of a captured image $I_{CAM1}$ obtained by a front infrared camera in an unheld state.

The captured image $I_{CAM1}$ obtained by the front infrared camera 305 in an upheld state will be exemplarily described with reference to FIG. 5. An infrared camera is an apparatus which captures an image visualizing the intensity information of near-infrared light, and has the property of visualizing venous vessels (superficial vessels) located immediately below the skin as the surface of a subject by using the following properties of near-infrared light:

The skin is made transparent by near-infrared light to some extent.

Near-infrared light is absorbed by a blood vessel portion including hemoglobin, and the blood vessel is depicted darker than the surroundings.

An infrared camera image 500 can be handled as a morphological image to clearly depict the shape of a superficial vessel under the skin. Referring to FIG. 5, a breast contour shape 501 in a held state, a nipple 502, and a superficial vessel 503 are depicted on the infrared camera image 500.

Coordinates on a two-dimensional coordinate system $C_{IMG1}$ of the captured image $I_{CAM1}$ obtained by the front infrared camera 305 have a one-to-one relationship with a straight line passing through the focal position as the origin and a point on a projection plane of the camera in a three-dimensional space, that is, a visual line in the three-dimensional camera coordinate system $C_{CAM1}$. A coordinate transformation method between a general captured image and a three-dimensional space is used for transformation between the camera coordinate system $C_{CAM1}$ and the coordinate system $C_{IMG1}$ of the captured image obtained by the front infrared camera 305, and a description thereof will be omitted. In addition, the captured images obtained by the rear infrared camera 306 and the side infrared camera 307 are the same as the captured image obtained by the front infrared camera 305 except for different viewpoint positions, and a description thereof will be omitted.

A processing procedure by the image processing apparatus will be described with reference to the flowchart of FIG. 6. In step S601, the medical image obtaining unit 101 obtains an MRI image of a subject, which is held in the medical image DB 11, and outputs the MRI image to a three-dimensional shape obtaining unit 102, a rigidity transformation unit 106, and a deformed image generation unit 110.

In step S602, the three-dimensional shape obtaining unit 102 performs image processing for the input MRI image, and obtains the following information as the outer shape information (surface shape information) of the subject. That is, the three-dimensional shape obtaining unit 102 detects the position (surface position) of each pixel corresponding to the surface of the subject, and obtains information representing the surface shape of the subject. In addition, in step S603, the three-dimensional shape obtaining unit 102 obtains the position of a feature point in the MRI image based on the three-dimensional curvature of the shape obtained from the detected surface positions. If the subject is a breast, the feature point in the MRI image is the nipple. In the following description, the three-dimensional shape obtaining unit 102 functions as an information obtaining unit which obtains information indicating the nipple position. The three-dimensional shape obtaining unit 102 outputs the obtained surface shape and the nipple position to the rigidity transformation unit 106 and a deformation estimation unit 109. In this embodiment, the surface shape of the subject obtained from the MRI image is a shape model of the subject in an upheld state.

Figure 7A:
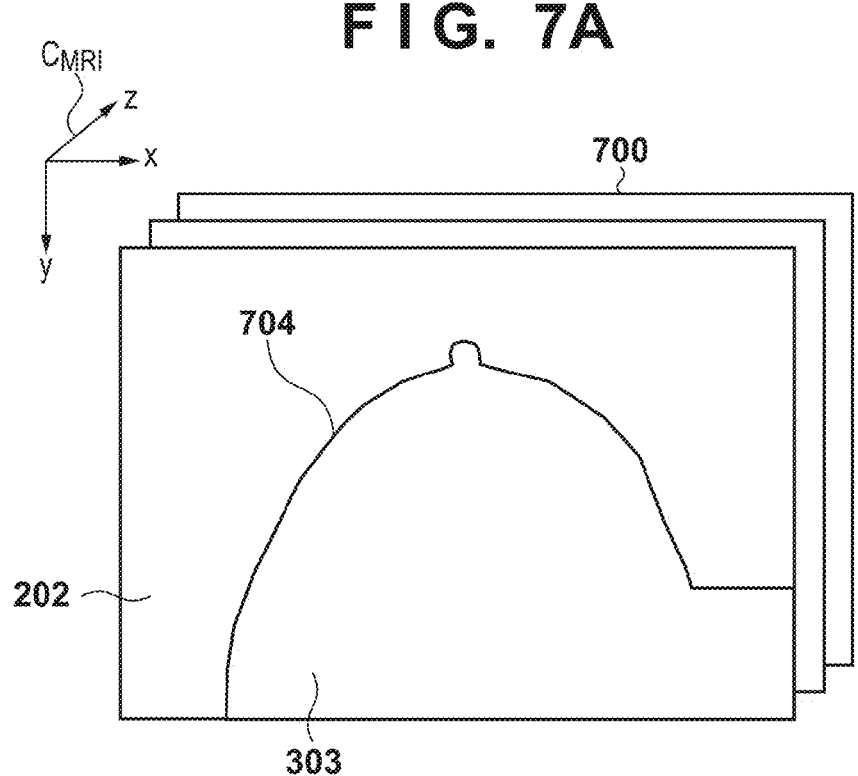
FIGS. 7A and 7B are views for explaining surface shape obtaining processing.
Figure 7B:
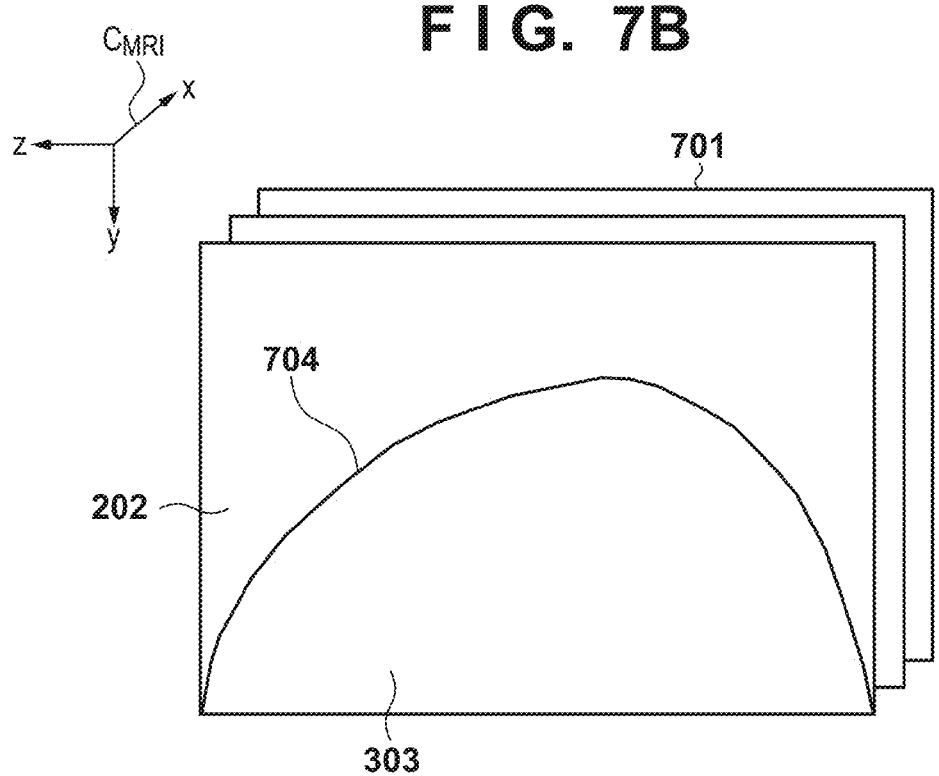

FIGS. 7A and 7B are views for explaining the surface shape obtaining processing by the three-dimensional shape obtaining unit 102. FIGS. 7A and 7B show surface detection images 700 and 701 obtained by detecting a boundary 704 (surface positions) between the extracorporeal area 202 and the intracorporeal area 203 of the subject from the MRI images 200 and 301 shown in FIGS. 2A and 2B. The surface detection images 700 and 701 may be, for example, binary images in which it is possible to discriminate the surface of the subject from the remaining portion.

In this embodiment, $N_S$ point groups $P_{Sk}$ ($1 \leq k \leq N_S$) are obtained as the surface shape of the subject, and the positions of the point groups are recorded as three-dimensional position coordinate vectors $V_{Sk\_MRI}$ in the MRI image coordinate system $C_{MRI}$.

In step S604, the PAT image obtaining unit 103 obtains the PAT image of the subject imaged by the PAT 12, and outputs the PAT image to a deformed image evaluation unit 111 and an image display unit 112. In addition, the PAT image obtaining unit 103 outputs the additional information contained in the header portion of the PAT image, for example, the coordinate transformation matrices $T_{PtoD}$, $T_{C1toD}$, $T_{C2toD}$, and $T_{C3toD}$ to the deformed image evaluation unit 111. Assume that the PAT image obtained by the PAT image obtaining unit 103 is a three-dimensional image obtained by imaging the distribution of optical energy accumulation amounts in the subject with respect to a predetermined wavelength.

In step S605, the camera image obtaining unit 104 obtains infrared camera images of the subject in an unheld state and a held state, which are captured by the front infrared camera 305, rear infrared camera 306, and side infrared camera 307 of the PAT 12. The camera image obtaining unit 104 outputs the obtained infrared camera images to a two-dimensional shape obtaining unit 105 and a virtual projected image evaluation unit 108. The infrared camera images obtained in this case are captured images $I_{CAMi}$ in a held state and captured images $I'_{CAMi}$ in an unheld state (i=1, 2, 3).

The PAT image obtaining unit 103 and the camera image obtaining unit 104 may directly obtain images from the PAT 12 in synchronism with imaging by the PAT 12, or may obtain images captured and recorded in the past from a medical image recording apparatus (not shown). The PAT image obtaining unit 103, the camera image obtaining unit 104, and the above-described medical image obtaining unit 101 respectively function as image obtaining units which obtain images.

In step S606, the two-dimensional shape obtaining unit 105 performs image processing for each input infrared camera image, and obtains a breast contour shape (501 in FIG. 5) and a nipple image (502 in FIG. 5) as the outer shape information (surface shape information) of the subject. The two-dimensional shape obtaining unit 105 outputs the breast contour shape and the nipple position to the rigidity transformation unit 106 and the deformed image evaluation unit 111. For example, it is possible to use a general edge detection technique to obtain (detect) the breast contour shape. In addition, the nipple position can be obtained (detected) based on the curvature of a curve representing the boundary of the breast area. Note that a method of obtaining (detecting) a nipple contour shape and a nipple position is not limited to the above method.

In step S607, the rigidity transformation unit 106, a virtual projected image generation unit 107, and a virtual projected image evaluation unit 108 align the subject in an unheld state with the MRI image by using the MRI image and information of a linear area which includes a superficial vessel and its surrounding area and is depicted in each infrared camera image in an unheld state. Note that an unheld state is an early stage in the second state (the position and shape of the subject at the time of PAT imaging). More specifically, the rigidity transformation unit 106, the virtual projected image generation unit 107, and the virtual projected image evaluation unit 108 generate a virtual image by virtually observing an MRI image using an infrared camera based on each of candidate values of a hypothesized alignment parameter, and estimate the alignment parameter by comparing the virtual image with the infrared camera image. This alignment (alignment in an unheld state) will be described in detail later. With the processing in this step, a coordinate transformation matrix $T_{MtoC1}$ representing rigidity transformation from the MRI image coordinate system $C_{MRI}$ to the front camera coordinate system $C_{CAM1}$ is obtained as an alignment parameter.

In step S608, the rigidity transformation unit 106 calculates a coordinate transformation matrix $T_{MtoD}$ representing rigidity transformation from the MRI image coordinate system $C_{MRI}$ to the PAT apparatus coordinate system $C_{DEV}$ based on the coordinate transformation matrix $T_{MtoC1}$. The rigidity transformation unit 106 calculates the coordinate transformation matrix $T_{MtoD}$ by multiplying the coordinate transformation matrix $T_{MtoC1}$ by the coordinate transformation matrix $T_{C1toD}$ from the front camera coordinate system $C_{CAM1}$ held in the image processing apparatus 10 to the PAT apparatus coordinate system $C_{DEV}$.

In step S609, the deformation estimation unit 109, the deformed image generation unit 110, and the deformed image evaluation unit 111 align the subject in a held state with the MRI image based on the alignment result in an upheld state (to be referred to as "estimation of compression deformation" hereinafter). Although described in detail later, compression deformation of the MRI image is estimated by using a physical deformation simulation. That is, a physical deformation simulation is performed while the deformation parameter is variously changed, and a predetermined evaluation value representing the appropriateness of deformation is obtained by comparing the resultant image with the PAT image. A deformation parameter which minimizes the evaluation value is then estimated as an alignment parameter. A deformed MRI image $I_{D\_MRIonP}$ (deformed three-dimensional image) is generated as an estimation result by using the estimated deformation parameter.

Figure 8:
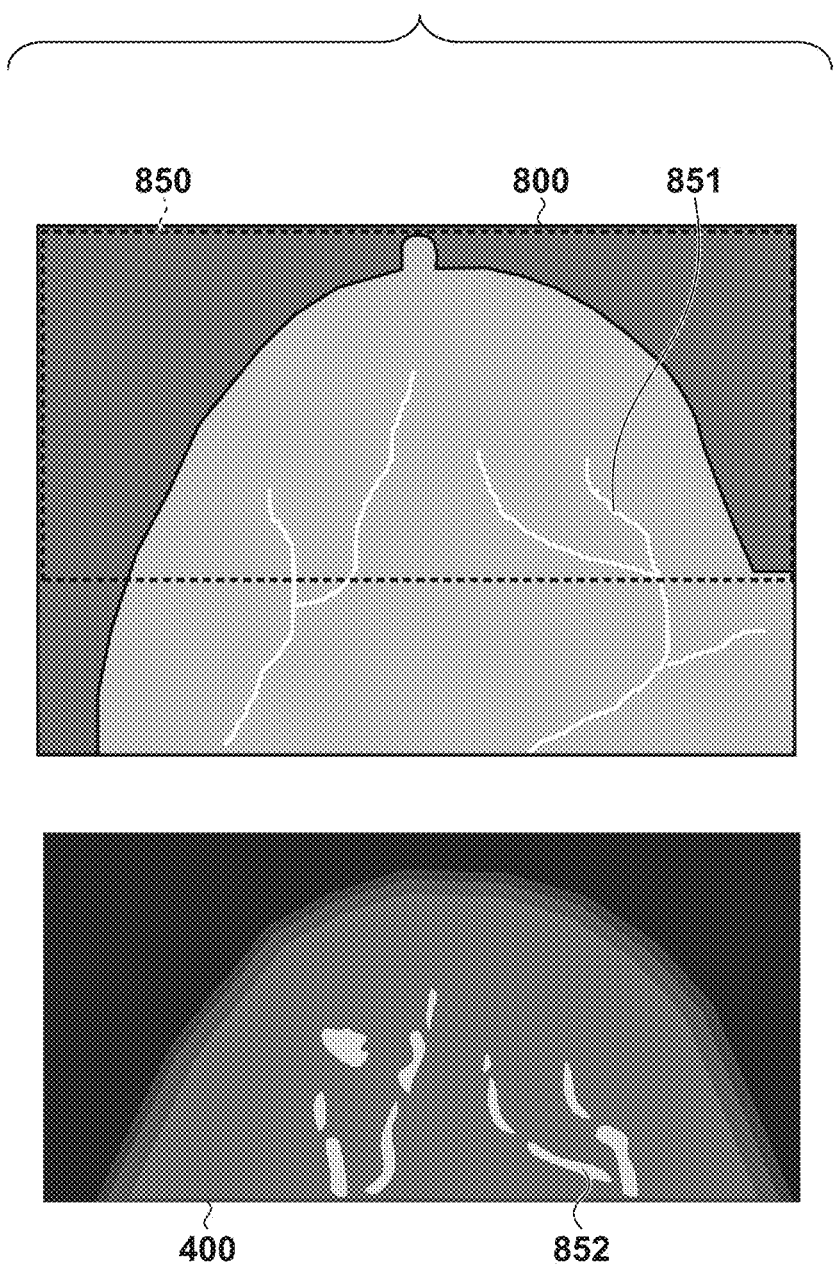
FIG. 8 is a view showing display examples of a deformed MRI image and a PAT image.

In step S610, the image display unit 112 displays the generated deformed three-dimensional image (deformed MRI image) and the PAT image obtained in step S603 on a display unit (not shown) side by side. FIG. 8 is a view showing display examples of the deformed MRI image and the PAT image. In the example shown in FIG. 8, a deformed MRI image 800 and the PAT image 400 of the same axial slice are vertically arranged side by side. A corresponding area 850 represented by a broken line rectangle superimposed on the deformed MRI image 800 is display information presenting an area corresponding to the display area of the PAT image 400 to the user.

Note that the alignment unit 113 is constituted by the three-dimensional shape obtaining unit 102, the two-dimensional shape obtaining unit 105, the rigidity transformation unit 106, the virtual projected image generation unit 107, the virtual projected image evaluation unit 108, the deformation estimation unit 109, the deformed image generation unit 110, and the deformed image evaluation unit 111. The image obtaining units 101, 103, and 104 of the image processing apparatus respectively obtain the first image (three-dimensional image) by imaging the object using the first imaging apparatus (for example, an MRI or CT apparatus), the second image (photoacoustic tomographic image) by imaging the object using a second imaging apparatus 120 (photoacoustic tomography apparatus) different from the first imaging apparatus, and the third images (infrared camera images) by imaging the object using the image capturing units 305, 306, and 307 whose positional relationships with the second imaging apparatus are associated with each other. The alignment unit 113 aligns the first image with the second image by comparing the shape information of the object in the first image with that of the object in the third image, and comparing the internal information of the object in the first image with that of the object in the second image (photoacoustic tomographic image) using the result of comparing the pieces of shape information.

(Alignment Processing in Unheld State)

Figure 9:
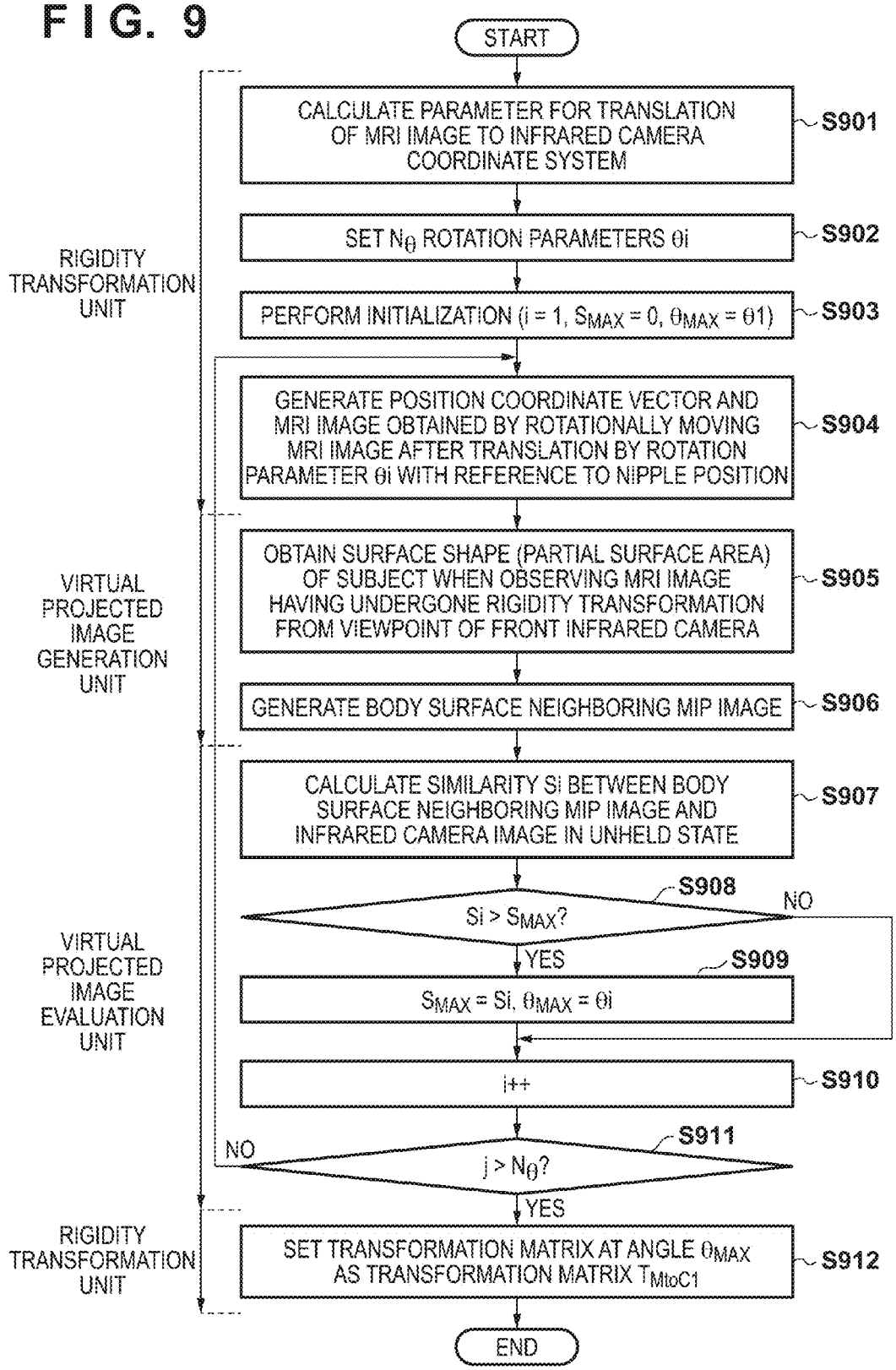
FIG. 9 is a flowchart for explaining the details of alignment in an unheld state.

The alignment processing in an unheld state which has been explained in step S607 will be described in detail. In the alignment processing in an unheld state, rigidity transformation from the MRI image coordinate system $C_{MRI}$ to the front camera coordinate system $C_{CAM1}$ is estimated. FIG. 9 is a flowchart for explaining the detailed processing procedure of alignment (step S607) in an unheld state.

In step S901, the rigidity transformation unit 106 calculates a parameter for translation of the MRI image to the infrared camera coordinate system (front camera coordinate system). First of all, the rigidity transformation unit 106 calculates a three-dimensional nipple position in the front camera coordinate system $C_{CAM1}$ from the two-dimensional nipple position obtained from each infrared camera image in an unheld state based on the triangulation principle. The rigidity transformation unit 106 calculates the coordinate transformation matrix $T_{MtoC1}$ representing translation from the MRI image coordinate system $C_{MRI}$ to the front camera coordinate system $C_{CAM1}$ so that the nipple position in the MRI image coincides with the three-dimensional nipple position in an unheld state obtained from each infrared camera image.

In step S902, the rigidity transformation unit 106 sets candidate values (hypotheses) $\theta i = \{\theta x, \theta y, \theta z\}$ ($1 \le i \le n_\theta$) of a plurality of ($N_\theta$) rotation parameters as combinations of values which the respective components (rotational angles about the three axes) for the rotational movement of the subject in the MRI image can take. In other words, the rigidity transformation unit 106 sets candidate values of rigidity transformation parameters as combinations of the rotation parameter candidate values $\theta i$ in this processing and the translation parameter calculated in step S901. In addition, considering that the relationship between the PAT image coordinate system and the front camera coordinate system is known, this operation is equivalent to setting candidate values of rigidity transformation from the MRI image (the subject in the first state) to the PAT image (the subject in the second state). Letting θx be a rotational angle about the x-axis, and θz be a rotational angle about the z-axis, the following five angles are set in increments of 5° in the range from −10° to +10°.

$$\theta x = \{-10, -5, 0, +5, +10\}$$

$$\theta z = \{-10, -5, 0, +5, +10\}$$

In addition, letting θy be a rotational angle about the y-axis, the following 72 angles are set in increments of 5° in the range from −180° to +180°.

$$\theta y = \{-180, -175, \ldots, -5, 0, +5, \ldots, +175, +180\}$$

In this case, the number $N_\theta$ of values (the total number of candidate values (hypotheses)) which the rotation parameter θi can take is 1800 (=5×5×72) (that is, 1≤i≤1800).

In step S903, the rigidity transformation unit 106 performs initialization. That is, the rigidity transformation unit 106 sets 1 in a loop variable i, 0 in a maximum value $S_{MAX}$ of similarities Si (to be described later), and $\theta_1$ in an angle $\theta_{MAX}$ (to be described later).

In step S904, the rigidity transformation unit 106 outputs, to the virtual projected image generation unit 107, a position coordinate vector $v_{Sk\_MRIonC1}i$ and an MRI image $I_{MRIonC1}i$ obtained by rotationally moving the MRI image after translation by the rotation parameter θi with reference to the nipple position. That is, the rigidity transformation unit 106 calculates a coordinate transformation matrix T2i which rotationally moves the image by the rotation parameter θi in the front camera coordinate system $C_{CAM1}$. Subsequently, the rigidity transformation unit 106 derives a coordinate transformation matrix $T_{MtoC1}i$ representing rigidity transformation obtained by multiplying a coordinate transformation matrix $T1_{MtoC1}$ for translation derived in step S901 by the coordinate transformation matrix T2i. The rigidity transformation unit 106 then generates the MRI image $I_{MRIonC1}i$ and the position coordinate vector $v_{Sk\_MRIonC1}i$ by coordinate-transforming the MRI image and a position coordinate vector $v_{Sk\_MRI}$ of the surface shape of the subject by using the coordinate transformation matrix $T_{MtoC1}i$.

In step S905, the virtual projected image generation unit 107 obtains, as a partial surface area, the surface shape of the subject expected to enter the field of view when observing the MRI image having undergone rigidity transformation from the viewpoint of the front infrared camera 305. In other words, the virtual projected image generation unit 107 generates a virtual image obtained when the MRI image having undergone rigidity transformation is seen from the viewpoint of the front infrared camera 305, based on the surface shape as information representing the surface position and the rigidity transformation parameter (the coordinate transformation matrix $T_{MtoC1}i$ representing rigidity transformation) as a candidate value of the alignment parameter.

Figure 10:
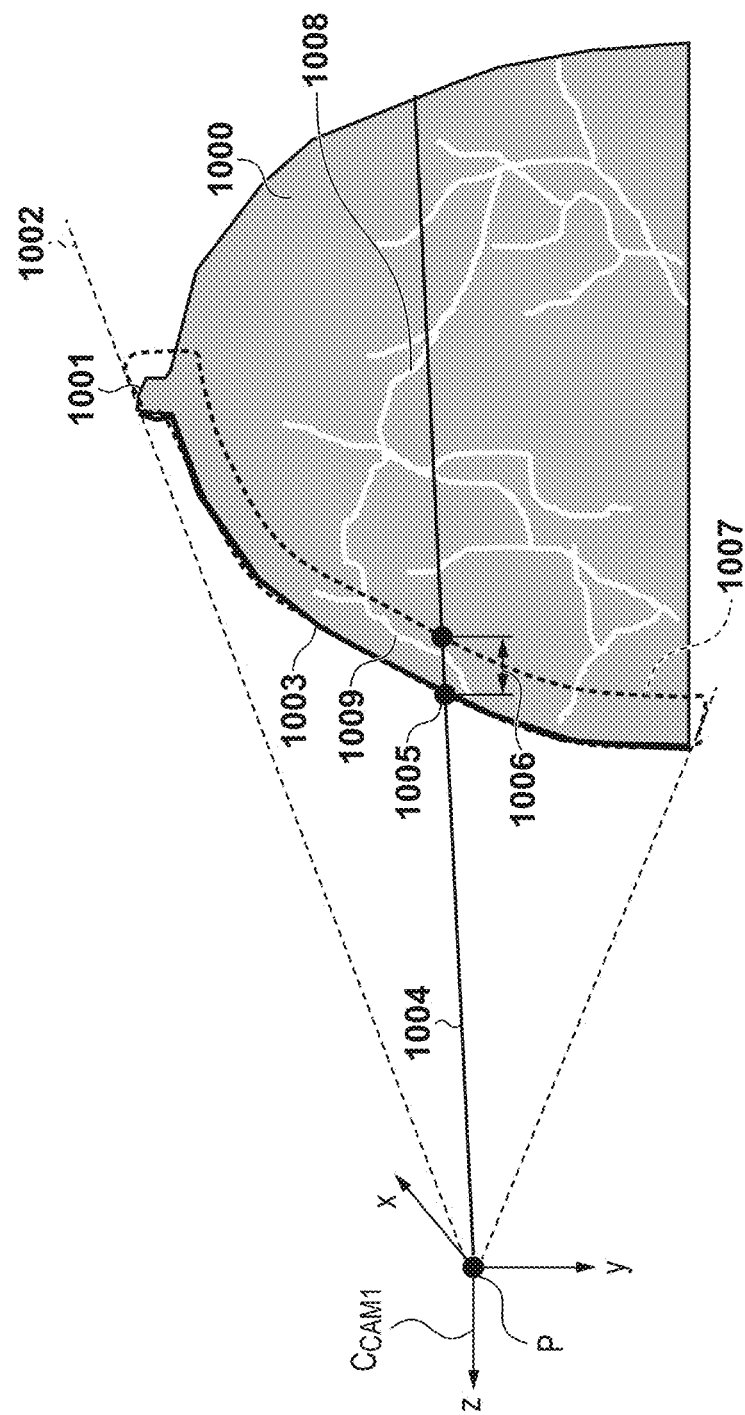
FIG. 10 is a view for explaining processing in which a virtual projected image generation unit obtains a partial surface area.

FIG. 10 is a view for exemplarily explaining the processing (step S905) in which the virtual projected image generation unit 107 obtains a partial surface area. FIG. 10 shows the state of the subject on the MRI image which is observed from a viewpoint P of the front infrared camera 305. An MRI breast area 1000 has undergone rigidity transformation so that a nipple position 1001 coincides with the nipple position in the infrared camera. In step S905, the virtual projected image generation unit 107 obtains a partial surface area 1003 observed from the viewpoint P by performing perspective projection with reference to the position/orientation of the viewpoint P. The virtual projected image generation unit 107 extends a projection line 1004 from the viewpoint P, and specifies an observation range 1002 in which the projection line 1004 intersects with the position coordinate vector $v_{Sk\_MRIonC1}i$ representing the body surface shape of the MRI breast area 1000. In the observation range 1002, the virtual projected image generation unit 107 obtains, from the position coordinate vector $v_{Sk\_MRIonC1}i$, a body surface point 1005 with which the projection line 1004 intersects first by setting the viewpoint P as a starting point. The virtual projected image generation unit 107 determines the partial surface area 1003 by obtaining the surface points 1005 with respect to all the projection lines 1004 included in the observation range 1002.

Subsequently, the virtual projected image generation unit 107 generates an MIP image using neighborhood information of the partial surface area 1003 in the MRI image having undergone rigidity transformation, and outputs the generated MIP image to the virtual projected image evaluation unit 108. Note that MIP stands for "maximum intensity projection", and the MIP image generated in step S906 will be referred to as a "body surface neighboring MIP image $I_{MIPonC1}i$" hereinafter.

The virtual projected image generation unit 107 sets a body surface neighboring zone 1006 having a predetermined distance (for example, 5 mm) in a direction away from the viewpoint P by setting, as a starting point, the body surface point 1005 with which the projection line 1004 intersects first. The virtual projected image generation unit 107 then defines a body surface neighboring area 1007 by setting the body surface neighboring zones 1006 with respect to all the projection lines 1004 included in the observation range 1002. Subsequently, the virtual projected image generation unit 107 performs perspective projection with reference to the position/orientation of the viewpoint P, and generates the body surface neighboring MIP image $I_{MIPonC1}i$ as an MIP image limited to an area, of the MRI image $I_{MRIonC1}i$, which is included in the body surface neighboring area 1007. This generates an MIP image by visualizing only the information of a linear area (to be referred to as a superficial vessel 1009 hereinafter) including a superficial vessel and its surrounding area near the body surface on the front infrared camera 305 side in a linear area (to be referred to as a blood vessel area 1008 hereinafter) including the blood vessel area and its surrounding area of the MRI image. Note that when generating the body surface neighboring area 1007, the skin of the subject need not be included in the area. More specifically, the area obtained by making the partial surface area 1003 have a predetermined thickness corresponding to the skin thickness may be derived as a skin area, and the skin area may be excluded from the body surface neighboring area 1007 obtained in the above processing. The skin of the subject has a high luminance value in the MRI image. This exclusion processing can therefore depict a superficial vessel more clearly in the generated MIP image.

As described above, it is possible to prevent the visualization of a blood vessel area in the breast or a blood vessel area existing near the body surface on the opposite side to the front infrared camera 305 by visualizing only the information of an area located near the body surface and expected to be observed from the viewpoint P of the front infrared camera 305. That is, it is possible to generate the body surface neighboring MIP image $I_{MIPonC1}i$ as an MIP image closer to the actual infrared camera image.

Note that the method of generating the body surface neighboring MIP image $I_{MIPonC1}i$ is not limited to the above method as long as only an area near the body surface can be visualized or an area near the body surface can be visualized while being enhanced. There is provided another method of generating an MIP image while reducing a weight corresponding to a luminance value as the distance from the body surface point 1005 on the projection line 1004 increases in a direction away from the viewpoint P. This method generates an MIP image with luminance values being increased toward the body surface in an area inside a breast, and hence generates an MIP image with enhanced superficial vessels. Obviously, when generating an MIP image by the above processing, it is possible to more clearly depict superficial vessels by excluding a skin area from depiction targets.

Figure 11:
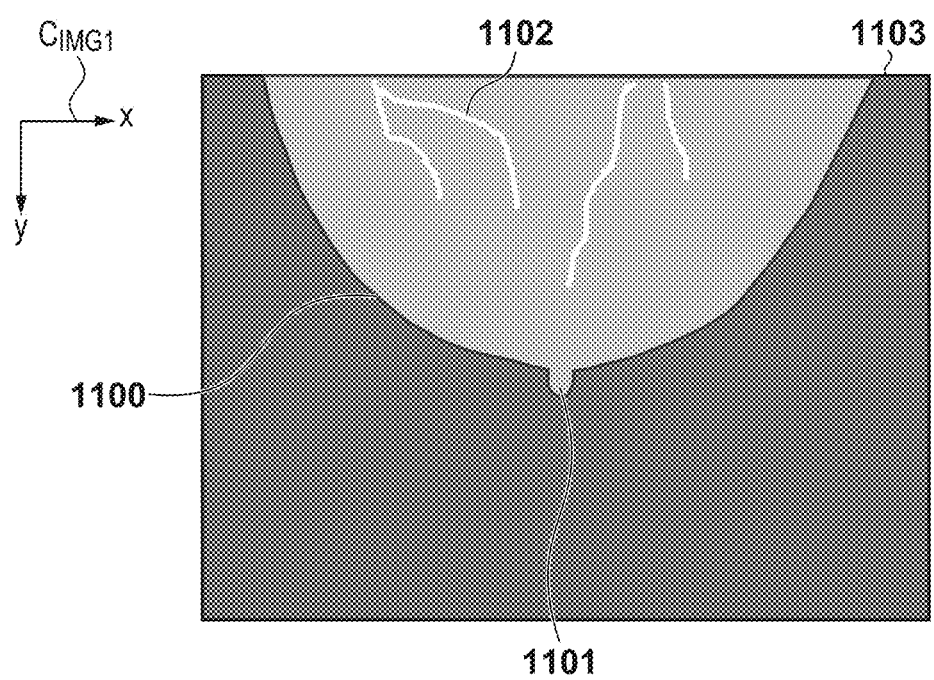
FIG. 11 is a view showing an MIP image using the body surface neighborhood information of a subject in an MRI image.

FIG. 11 is a view exemplarily showing an MIP image 1103 using body surface neighborhood information of the subject in the MRI image. Referring to FIG. 11, the body surface neighboring MIP image $I_{MIPonC1}i$ is displayed as a two-dimensional image on the front camera image coordinate system $C_{IMG1}$. This is because coordinate transformation (step S906) at the time of the generation of a two-dimensional MIP image by perspective projection based on the viewpoint P is geometrically equivalent to coordinate transformation (camera imaging process) from the three-dimensional front camera coordinate system $C_{CAM1}$ to the two-dimensional front camera image coordinate system $C_{IMG1}$.

In addition, since an area outside the body surface is not included in processing targets when generating an MIP image, there is no significant luminance value outside a breast contour shape 1100. Furthermore, rigidity transformation has been performed such that the nipple position 1001 in the MRI image coincides with the position of the nipple 502 in the captured image $I_{CAM1}$ obtained by the front infrared camera 305, a nipple 1101 in the MIP image coincides with the nipple 502 in the captured image $I_{CAM1}$ (FIG. 5). In the MIP image, a superficial vessel 1102 is visualized in particular as a high-luminance area.

In step S907, the virtual projected image evaluation unit 108 calculates the similarity Si between the body surface neighboring MIP image $I_{MIPonC1}i$ and the infrared camera image $I'_{CAM1}$ in an unheld state based on the luminance information of the superficial vessel visualized in both the images. The virtual projected image evaluation unit 108 excludes, from the similarity calculation areas, the areas of both the body surface neighboring MIP image $I_{MIPonC1}i$ and the infrared camera image $I'_{CAM1}$ in an unheld state, which are located outside the breasts, and limits the similarity calculation areas to the areas inside the breasts.

The superficial vessel 1102 (FIG. 11) in the body surface neighboring MIP image $I_{MIPonC1}i$ is visualized with higher luminance than that of the surrounding breast area. On the other hand, the superficial vessel 503 (FIG. 5) in the infrared camera image $I'_{CAM1}$ is visualized with lower luminance than that of the surrounding breast area. For this reason, the virtual projected image evaluation unit 108 inverts the luminance value of the body surface neighboring MIP image $I_{MIPonC1}i$ to make it possible to directly compare the pieces of luminance information of the images. The virtual projected image evaluation unit 108 then calculates the similarity Si ($0 \leq Si \leq 1$) between the infrared camera image $I'_{CAM1}$ and the body surface neighboring MIP image whose luminance value has been inverted. Assume that the value of the similarity Si increases (toward 1) when the superficial vessel 1102 (FIG. 11) in the body surface neighboring MIP image $I_{MIPonC1}i$ becomes similar to the superficial vessel 503 (FIG. 5) in the infrared camera image $I'_{CAM1}$.

Note that in this embodiment, the mutual information amount between images is used as an evaluation criterion for the similarity Si. However, the evaluation criterion is not limited to this, and a known technique using a cross-correlation coefficient or SSD (Sum of Squared Difference) may be used. In addition, there is no need to use an evaluation criterion directly based on a luminance value. For example, image features such as edges may be detected from two images, and a criterion that calculates the similarity or degree of coincidence between them may be used.

In step S908, the virtual projected image evaluation unit 108 compares the similarity Si with the maximum value $S_{MAX}$ of similarities. If the similarity Si exceeds the maximum value $S_{MAX}$ ($Si > S_{MAX}$) (YES in step S908), the process advances to step S909.

In step S909, the virtual projected image evaluation unit 108 updates the maximum value $S_{MAX}$ ($S_{MAX}=Si$), and updates the angle $\theta_{MAX}$ corresponding to the maximum value $S_{MAX}$ ($\theta_{MAX}=\theta i$). On the other hand, if the similarity Si is equal to or less than the maximum value $S_{MAX}$ ($Si \leq S_{MAX}$) (NO in step S908), the virtual projected image evaluation unit 108 advances the process to step S910 without performing updating in step S909.

The virtual projected image evaluation unit 108 increments the loop variable i in step S910, and compares the loop variable i with the total number $N_\theta$ of hypotheses (step S911). If the loop variable i is equal to or less than the total number $N_\theta$ of hypotheses ($i \leq N_\theta$) (NO in step S911), the virtual projected image evaluation unit 108 returns the process to step S904. If the loop variable i exceeds the total number $N_\theta$ of hypotheses ($i > N_\theta$) (YES in step S911), the virtual projected image evaluation unit 108 advances the process to step S912. That is, the processing from step S904 to step S911 is repeated by the total number $N_\theta$ of hypotheses.

When the processing corresponding to the total number $N_\theta$ of hypotheses is complete, the rigidity transformation unit 106 sets, in step S912, a coordinate transformation matrix $T_{MtoC1}MAX$ at the angle $\theta_{MAX}$ as the final coordinate transformation matrix $T_{MtoC1}$ representing rigidity transformation from the MRI image coordinate system $C_{MRI}$ to the front camera coordinate system $C_{CAM1}$. In other words, the rotation parameter $\theta_{MAX}$ corresponding to the maximum value $S_{MAX}$ of similarities is selected from the plurality of rotation parameters.

With the above operation, the alignment processing (step S607) in an upheld state performed by the rigidity transformation unit 106, the virtual projected image generation unit 107, and the virtual projected image evaluation unit 108 is terminated. This processing obtains the coordinate transformation matrix $T_{MtoC1}$ based on the angle $\theta_{MAX}$ at which the body surface neighboring MIP image $I_{MIPonC1}i$ generated based on various rigidity transformation parameter hypotheses (that is, rotation parameter hypotheses $\theta i$) becomes most similar to the infrared camera image $I'_{CAM1}$.

In the above processing, the case has been exemplified in which the body surface neighboring MIP image $I_{MIPonC1}i$ transformed to the front camera image coordinate system $C_{IMG1}$ is generated, and the similarity Si with the image $I'_{CAM1}$ obtained by the front infrared camera 305 is evaluated. However, an evaluation target of the similarity Si is not limited to the front infrared camera 305.

For example, the body surface neighboring MIP image $I_{MIPonC1}i$ transformed to the rear camera image coordinate system $C_{IMG2}$ or the side camera image coordinate system $C_{IMG3}$ is generated. Then, the similarity between the body surface neighboring MIP image $I_{MIPonC1}i$ and the image $I'_{CAM2}$ obtained by the rear infrared camera 306 or the image $I'_{CAM3}$ obtained by the side infrared camera 307 may be evaluated. In this case, the viewpoint P for perspective projection in steps S905 and S906 may be replaced by the camera viewpoint of the rear infrared camera 306 or the side infrared camera 307 with respect to the candidate value $T_{MtoC1}i$ of a coordinate transformation matrix obtained in step S904.

In this example, the MRI image $I_{MRIonC1}i$ and the position coordinate vector $v_{Sk\_MRIonC1}i$ are transformed to the front camera image coordinate system $C_{IMG1}$ in step S904. Therefore, as the position/orientation of the camera viewpoint used for this perspective projection, a position/orientation expressed on the front camera coordinate system $C_{IMG1}$ may be used.

As described above, the positional relationships of the respective infrared cameras (front, side, and rear infrared cameras) are associated with each other with reference to the PAT apparatus coordinate system $C_{DEV}$. This makes it possible to derive a coordinate transformation matrix from the front camera coordinate system $C_{CAM1}$ to the rear camera coordinate system $C_{CAM2}$ or the side camera coordinate system $C_{CAM3}$. That is, it is possible to derive the position/orientation of the camera viewpoint of the rear or side infrared camera in the front camera coordinate system $C_{CAM1}$.

An integrated similarity may be calculated by integrating similarities based on the front, rear, and side infrared cameras, thereby evaluating the similarity. Examples of the integrated similarity are the weighted average value, maximum value, minimum value, and median value of these three types of similarities. In the above processing, the rotation parameter θi is set and coordinate transformation for perspective projection of the MRI image on each camera coordinate system is performed with reference to the front camera coordinate system $C_{CAM1}$. However, candidate values for an alignment parameter for the rigidity transformation $T_{MtoD}$ between $C_{MRI}$ and $C_{DEV}$ may be set with reference to the PAT apparatus coordinate system $C_{DEV}$. In this case, it is only necessary to generate a body surface neighboring MIP image by the same processing as that in step S906 after viewing transformation to each infrared camera is performed in addition to rigidity transformation from $C_{MRI}$ to $C_{DEV}$. Subsequently, it is only necessary to estimate an alignment parameter based on the similarity evaluation with each infrared image.

(Estimation of Compression Deformation)

The details of estimation of compression deformation (step S609) will be described with reference to the flowchart of FIG. 12.

In step S1201, the deformation estimation unit 109 generates a three-dimensional mesh (to be referred to as a "mesh M" hereinafter) representing the shape of the subject by using the surface shape of the subject obtained in step S602 and the coordinate transformation matrix $T_{MtoD}$ obtained in step S608. The deformation estimation unit 109 calculates a position coordinate vector $V_{Si\_MRIonD}$ (1≤i≤Ns) of a subject surface point group in the PAT apparatus coordinate system $C_{DEV}$ by coordinate-transforming a surface shape $V_{Sk\_MRI}$ of the subject using the coordinate transformation matrix $T_{MtoD}$. The deformation estimation unit 109 then discriminates an inner area of the subject based on the surface shape represented by the position coordinate vector $V_{Si\_MRIonD}$, and arranges the mesh M in the inner area.

Figure 13A:
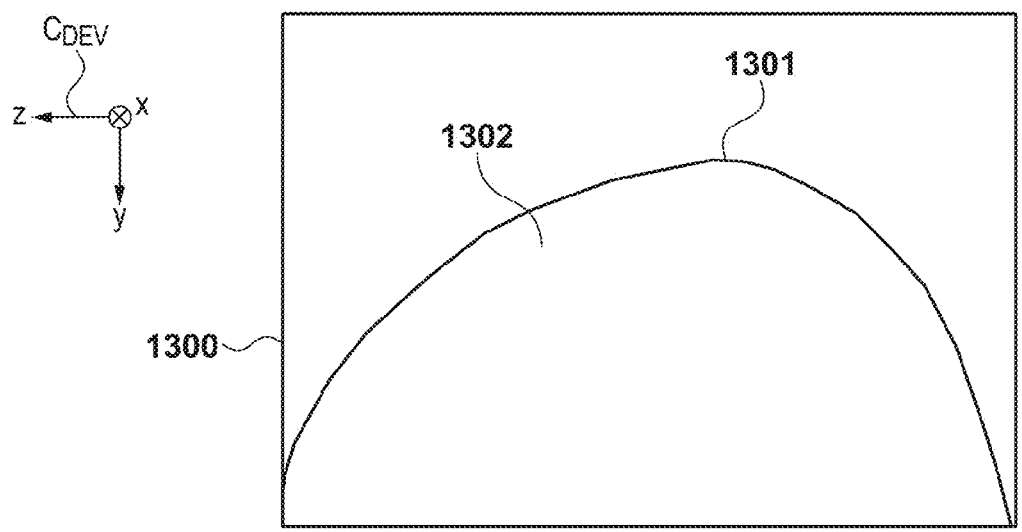
FIGS. 13A and 13B are schematic views showing a method of generating a mesh M.
Figure 13B:
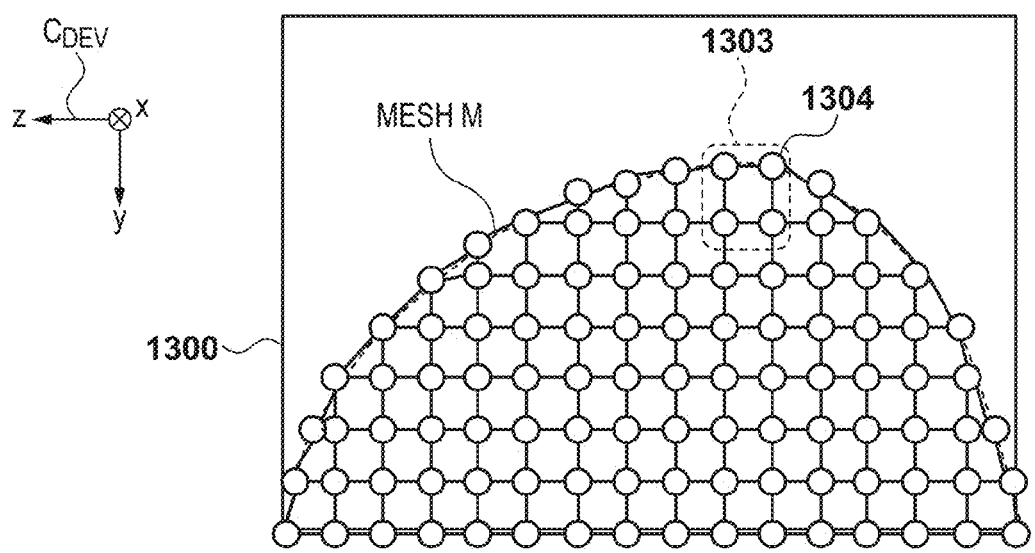

FIGS. 13A and 13B are views for exemplarily explaining a method of generating the mesh M. FIG. 13A shows a sagittal slice of a processing target area 1300 of the subject, and a surface position 1301 and inner area 1302 of the subject on the sagittal slice. As shown in FIG. 13B, the mesh M is generated by arranging elements 1303 having three-dimensional structures such as hexahedrons or tetrahedrons in the inner area 1302 of the subject. The mesh M is described by the positions of vertices (nodes) 1304 of these elements and concatenation information.

In the following description, the number of nodes of the mesh M arranged in step S1201 is represented by Nm, and the position of each node is represented by $s_L$ (1≤L≤Nm). Since a displacement field in the elements can be expressed by the displacement of each node, it is possible to obtain the displacement of an arbitrary point in the subject based on this displacement.

In step S1202, the deformation estimation unit 109 generates a plurality of (Np) deformation parameter hypotheses $p_k$ (1≤k≤Np) by combining values which the respective components (Young's moduli, Poisson ratios, and the like of the subject) of the deformation parameters can take. For example, the deformation estimation unit 109 generates the deformation parameters $p_k$ by dividing the range of values which each component can take at proper intervals and obtaining all combinations of divided ranges. For example, when Young's modulus ratio $p_y$ and a Poisson ratio $p_p$ are components of the deformation parameter $p_k$, the Young's modulus ratio $p_y$ and the Poisson ratio $p_p$ can take the following values.

$$p_y=\{1,2,3,4,5\}$$

$$p_p=\{0.0,0.2,0.4,0.45,0.499\}$$

The deformation estimation unit 109 then generates deformation parameters by combining the Young's modulus ratios $p_y$ and the Poisson ratios $p_p$. In the above case, Np=25 (=5×5). Note that the Young's modulus ratio $p_y$ is a parameter to cope with the anisotropy of hardness of the breast, and represents a Young's modulus ratio in the anteroposterior direction (y-axis direction) of the human body to a Young's modulus at a coronal plane (x-z plane) of the human body.

In step S1203, the deformation estimation unit 109 performs initialization processing. The deformation estimation unit 109 sets 1 in a loop variable k, 0 in a maximum value $E_{MAX}$ of evaluation values (to be described later), and $p_1$ in a deformation parameter $p_{MAX}$ (to be described later).

In step S1204, the deformation estimation unit 109 then generates a deformed mesh DMk as a mesh after deformation by performing a physical deformation simulation based on the finite element method for the mesh M using the deformation parameter $p_k$. A deformation function Fk(x, y, z) at this time is defined as a displacement vector $dk_L$ (1≤L≤Nm) which displaces each node from the mesh M to the deformed mesh DMk.

Figure 14A:
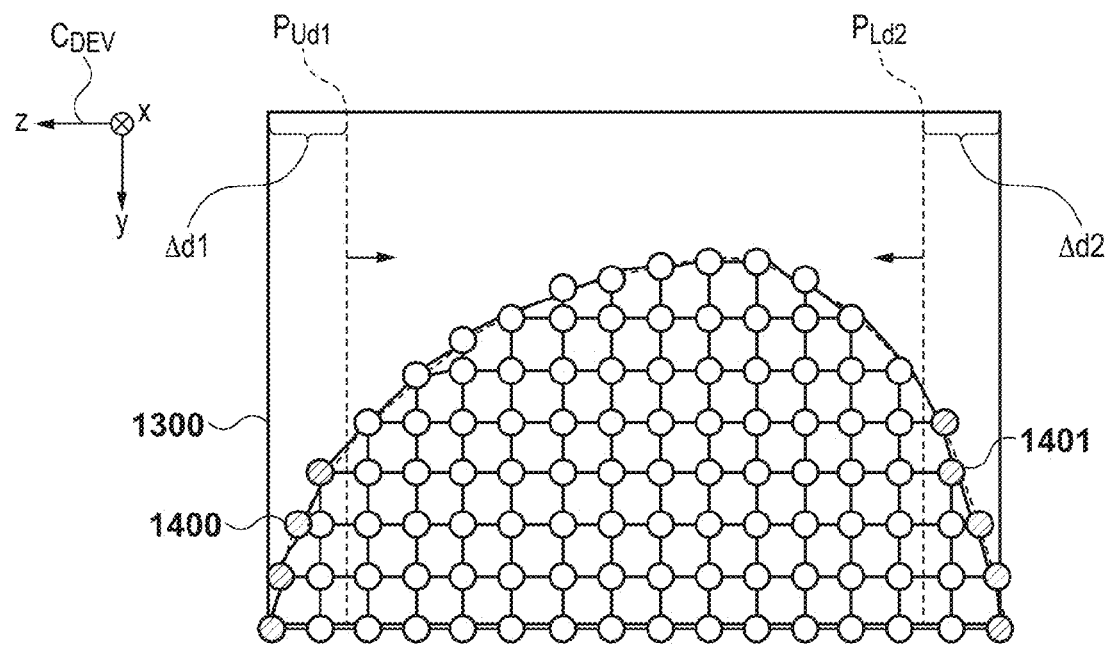
FIGS. 14A and 14B are views for explaining a compression deformation simulation using holding plates.
Figure 14B:
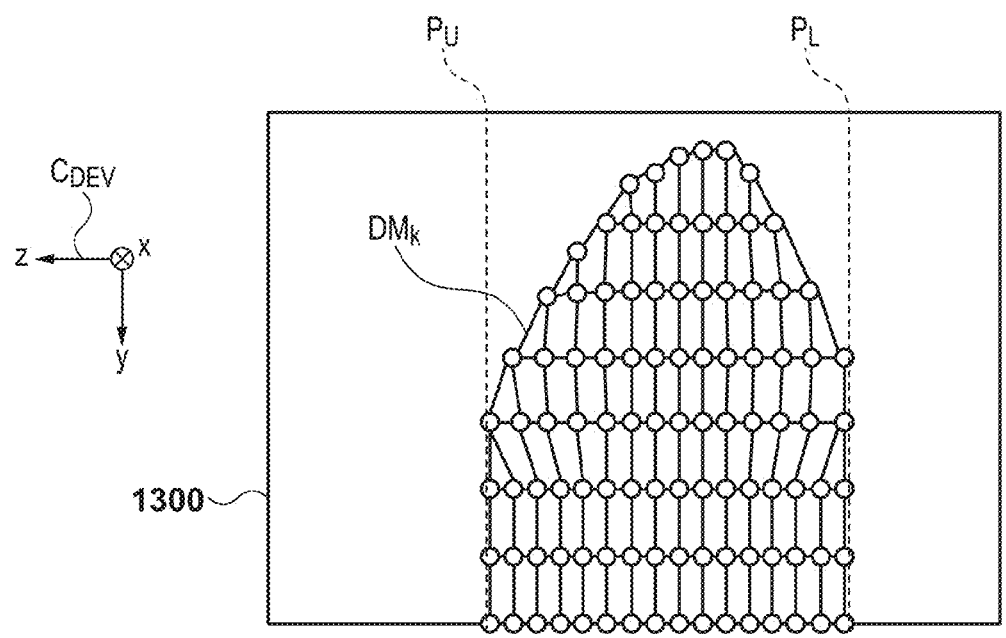

FIGS. 14A and 14B are views for exemplarily explaining a compression deformation simulation using holding plates as the physical deformation simulation performed in step S1204. In compression deformation using the holding plates, when the two holding plates are moved to the center of the subject, the surface areas of the subject which come into contact with the holding plates after the movement are pressed against (stick to) the holding plates.

Assume that the two holding plates are moved in directions indicated by arrows by distances Δd1 and Δd2, respectively, as shown in FIG. 14A. In this case, the deformation estimation unit 109 extracts outside surface nodes 1400 and 1401, which come into contact with holding surfaces $P_{Ud1}$ and $P_{Ld2}$, from the surface nodes representing the body surface among the nodes of the mesh M, and obtains displacement amounts for making the outside surface nodes 1400 and 1401 come into contact with the holding surfaces, respectively. The deformation estimation unit 109 executes calculation based on the finite element method by providing these displacement amounts as boundary conditions C for a deformation simulation, and generates a deformed mesh when the two holding plates move by the distances Δd1 and Δd2, respectively.

In this embodiment, until the two holding plates shown in FIG. 14B are moved to final holding positions $P_U$ and $P_L$, the deformation estimation unit 109 divisionally performs a plurality of (N) deformation simulations to cope with changes in boundary conditions which are made in the process of deformation. FIG. 14B shows the deformed mesh $DM_k$ as a result of repeating a deformation simulation N times. By comparison with FIG. 14A, it is understood that the deformed mesh of the subject is compressed in the z-axis direction and elongated in the y-axis direction between the holding positions $P_U$ and $P_L$ by physical deformation simulations, as shown in FIG. 14B.

In step S1205, the deformed image generation unit 110 generates a deformed MRI image by deforming the MRI image according to the deformation parameter $p_k$, and outputs the deformed MRI image to the deformed image evaluation unit 111. The deformed image generation unit 110 coordinate-transforms the MRI image to the PAT apparatus coordinate system $C_{DEV}$ using the coordinate transformation matrix $T_{MtoD}$, and performs deformation processing using the deformation function Fk(x, y, z) calculated in step S1204. The deformed image generation unit 110 then generates a deformed MRI image $I_{D\_MRIonP}k$ in the PAT image coordinate system $C_{PAT}$ by coordinate transformation using the inverse matrix of the coordinate transformation matrix $T_{PtoD}$.

Figure 15A:
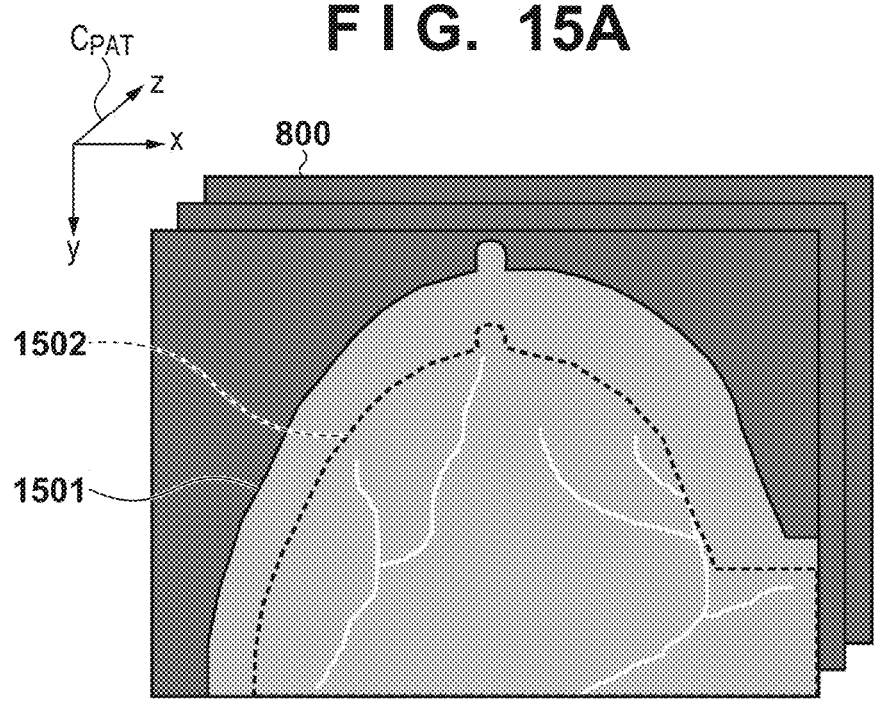
FIGS. 15A and 15B are schematic views each showing a deformed MRI image $I_{D\_MRIonP}$.
Figure 15B:
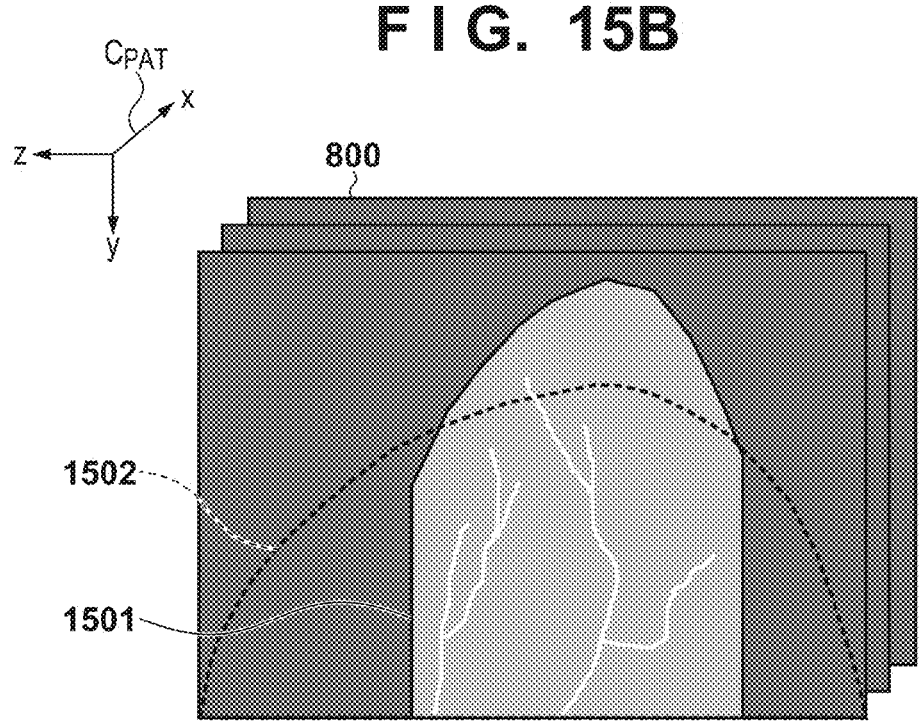

FIGS. 15A and 15B are views each exemplarily showing the deformed MRI image $I_{D\_MRIonP}$. FIGS. 15A and 15B show the deformed MRI image 800, a breast area 1501 after deformation, and a breast shape 1502 before deformation. FIG. 15A shows a two-dimensional image obtained by slicing the deformed MRI image $I_{D\_MRIonP}$ along an axial slice. FIG. 15B shows a two-dimensional image obtained by slicing the deformed MRI image $I_{D\_MRIonP}$ along a sagittal slice. By comparing the breast area 1501 after deformation with the breast shape 1502 before deformation, it is understood that compression in the z-axis direction of the PAT image coordinate system $C_{PAT}$ elongates the breast area on the x-y plane and compresses the area in the z-axis direction.

In step S1206, the deformed image evaluation unit 111 calculates an evaluation value Ek of the appropriateness of the deformed MRI image $I_{D\_MRIonP}k$ by using the PAT image which is obtained in step S604 and the infrared camera image in a held state which is obtained in step S605. The deformed image evaluation unit 111 then outputs the calculated evaluation value Ek to the deformation estimation unit 109. The deformed image evaluation unit 111 calculates the evaluation value Ek based on a similarity $S_{MRI}k$ ($0 \leq S_{MRI}, k \leq 1$) between the deformed MRI image and the PAT image and a residual difference Rk between the breast shape in the deformed MRI image and that in the infrared camera image in a held state.

Assume that the higher the evaluation value Ek, the more appropriate the deformation. In addition, a mutual information amount between the images is used as an evaluation criterion for the similarity $S_{MRI}k$, similarly to step S907. Note that the evaluation criterion is not limited to this, and it is possible to use any known technique using a cross-correlation coefficient, SSD, the degree of coincidence of the position of a feature point such as a blood vessel branch portion, or the like.

FIG. 8 shows identical axial slices of the deformed MRI image ($I_{D\_MRIonP}k$) 800 and the PAT image 400. The corresponding area 850 indicated by the broken line rectangle is an area on the deformed MRI image 800 corresponding to the PAT image 400. The similarity $S_{MRI}k$ is calculated between the PAT image 400 and the corresponding area 850. If a blood vessel area 851 in the deformed MRI image 800 and a blood vessel area 852 in the PAT image 400 which are visualized are similar to each other, the value of the similarity $S_{MRI}k$ between the PAT image 400 and the corresponding area 850 increases.

In addition, the residual difference Rk is calculated as the difference between the contour (silhouette) shape of the subject depicted in the infrared camera image and the exterior shape of the deformed mesh DMk projected on the infrared camera image. When, for example, projecting the deformed mesh DMk on the infrared camera image $I_{CAM1}$ in a held state, the deformed mesh DMk is coordinate-transformed to the front camera coordinate system $C_{CAM1}$ by using the inverse matrix of the coordinate transformation matrix $T_{C1toD}$, and is projected and transformed onto the front camera image coordinate system $C_{IMG1}$. It is also possible to project the deformed mesh DMk on the rear camera image $I_{CAM2}$ or side camera image $I_{CAM3}$ by the same method.

The residual difference Rk is calculated as, for example, an integrated residual difference (for example, the weighted average value of three residual differences) obtained by integrating the residual differences between the three infrared camera images and the exteriors of meshes obtained by projecting the deformed mesh DMk on each of the three infrared camera images. Note however that the integrated residual difference is not limited to the weighted average value, and may be the maximum value, minimum value, median value, or the like of the three residual differences.

In addition, the residual difference Rk may be calculated as the residual difference between the nipple position of the subject depicted in an infrared camera image and the nipple position of the deformed mesh DMk projected on the infrared camera image. Obviously, the residual difference Rk may be the value (for example, the weighted sum) obtained by integrating the residual difference in breast shape and the residual difference in nipple position. Note that the residual difference based on breast shapes or nipple positions is obtained from the infrared camera images in the above description. However, a residual difference may be obtained from a general camera image obtained by imaging the outer appearance of the breast.

The evaluation value Ek is represented as, for example, the weighted sum based on the similarity $S_{MRI}k$ and the residual difference Rk, as given by:

$$Ek = aS_{MRI}k + b\{1/(1+Rk)\} \quad (1)$$

where a and b are weight coefficients (a+b=1).

The reciprocal of (1+Rk) in the second term of equation (1) is used for the following reasons.

The residual difference Rk is an index which decreases in value with an increase in the appropriateness of the deformation in reverse to the evaluation value Ek.

The range of values which the residual difference Rk can take is 0 to 1 like the similarity $S_{MRI}k$.

In step S1207, the deformation estimation unit 109 compares the input evaluation value Ek with the maximum value $E_{MAX}$ of evaluation values. If the evaluation value Ek exceeds the maximum value $E_{MAX}$ of evaluation values (Ek>$E_{MAX}$) (YES in step S1207), the deformation estimation unit 109 advances the process to step S1208.

In step S1208, the deformation estimation unit 109 updates the maximum value $E_{MAX}$ ($E_{MAX}$=Ek). The deformation estimation unit 109 also updates the deformation parameter $p_{MAX}$ corresponding to the maximum value $E_{MAX}$ ($p_{MAX}$=$p_k$).

On the other hand, if it is determined in the comparison processing in step S1207 that the evaluation value Ek is equal to or less than the maximum value $E_{MAX}$ of evaluation values (Ek≤$E_{MAX}$) (NO in step S1207), the deformation estimation unit 109 advances the process to step S1209 without performing updating in step S1208.

Subsequently, in step S1209, the deformation estimation unit 109 increments the loop variable k. In step S1210, the deformation estimation unit 109 compares the loop variable k with the total number Np of hypotheses. If the loop variable k is equal to or less than the total number Np of hypotheses (k≤Np) (NO in step S1210), the deformation estimation unit 109 returns the process to step S1204. If the loop variable k exceeds the total number Np of hypotheses (k>Np) (YES in step S1210), the deformation estimation unit 109 advances the process to step S1211. That is, the processing from step S1204 to step S1210 is repeated by the total number Np of hypotheses.

When the processing corresponding to the total number Np of hypotheses is complete, the deformation estimation unit 109 outputs, in step S1211, the deformation parameter $p_{MAX}$ to the deformed image generation unit 110. In other words, the deformation parameter $p_{MAX}$ corresponding to the maximum value $E_{MAX}$ of evaluation values is selected from the plurality of deformation parameters.

In step S1212, the deformed image generation unit 110 obtains a deformed MRI image $I_{D\_MRIonP}$MAX corresponding to the deformation parameter $p_{MAX}$ as an estimation result ($I_{D\_MRIonP}$) of compression deformation, and outputs the deformed MRI image $I_{D\_MRIonP}$ to the image display unit 112.

With the above operation, the estimation processing (step S609) of compression deformation by the deformation estimation unit 109, the deformed image generation unit 110, and the deformed image evaluation unit 111 is terminated. According to this processing, deformation simulations are executed under various deformation parameter hypotheses $p_k$. The deformed MRI image $I_{D\_MRIonP}$ is then generated by the deformation parameter $p_{MAX}$ which maximizes the evaluation value Ek for the appropriateness of deformation among these simulation results.

In this manner, it is possible to improve the accuracy of alignment between a PAT image and an MRI image by comparing the MRI image with the PAT image and the image captured by the infrared camera mounted in the PAT 12, when a breast is a subject. That is, a two-dimensional MIP image with an enhanced superficial vessel, which is generated from an MRI image, is compared with an infrared camera image in an upheld state to estimate the position/orientation of the subject on the MRI image with respect to the infrared camera, thereby implementing accurate rigidity alignment between the MRI image and the infrared camera image. In addition, the MRI image is coordinate-transformed from the infrared camera coordinate system to the coordinate system of the PAT 12 to use the rigidity alignment result as an initial state in deformation alignment processing between the MRI image and the PAT image. That is, when performing alignment by comparing an MRI image with a PAT image, it is only required to estimate compression deformation from an upheld state to a held state. It is possible to accurately estimate compression deformation by deforming the MRI image so as to match both the breast shape depicted in the infrared camera image and the internal structure depicted in the PAT image.

Note that this embodiment uses the physical deformation simulation based on the finite element method as a technique of performing deformation alignment for an MRI image. However, the embodiment is not always limited to this method. For example, a general deformation method such as FFD (Free Form Deformation) may be used. In deformation processing using FFD, first of all, lattice-like control points are arranged to surround a subject in an image with a rectangular parallelepiped. Moving the control points can deform an image area existing in the rectangular parallelepiped. A set of deformation amounts of the respective control points is defined as deformation parameter candidate values (hypotheses) $p_k$ (1≤k≤Np). Deformation alignment meeting the above purpose can be implemented by calculating the deformation parameter $p_k$ which maximizes the evaluation value Ek in the above-described deformed image evaluation unit 111 while variously changing the value of the deformation parameter $p_k$.

Although this embodiment uses the breast of the human body as a subject, the embodiment is not limited to this. The subject can be anything as long as it is a portion of a living body which has a superficial vessel. In addition, as an image registered in the medical image database 11, an MRI image is used. However, an image captured by any modality can be used as long as the image is a three-dimensional image obtained by imaging a living body.

(Modification 1)

In the above alignment processing (step S607) in an upheld state, evaluation values are calculated by exhaustively changing the rotational angle for obtaining the position/orientation of the subject in the MRI image with respect to the infrared camera, and a rotational angle that provides an optimal evaluation value is obtained. However, it is possible to use another method of obtaining the position/orientation of a subject in an MRI image. That is, a rotational angle at which an optimal evaluation value is obtained may be estimated using a general optimization algorithm. For example, a method using the steepest descent method as one type of optimization algorithm will be described.

Let x be a three-dimensional vector, and (θx, θy, θz) be a parameter representing the rotational angle of a subject in an MRI image with respect to the infrared camera. When giving the vector x representing a rotational angle, let $S_{MIP}(x)$ be the similarity between the body surface neighboring MIP image and the infrared camera image generated in step S907. In the steepest descent method, when giving the vector x, a function f(x) for minimization is a reciprocal $1/S_{MIP}(x)$ of the similarity $S_{MIP}(x)$. In this case, the purpose of setting f(x) to the reciprocal of $S_{MIP}(x)$ is to obtain a parameter representing a rotational angle at which the similarity S(x) is maximized. The parameter x which minimizes f(x) (that is, maximizes $S_{MIP}(x)$) is calculated by updating and converging each variable set in the above manner by using:

$$x^{(k+1)} = x^{(k)} - \alpha \operatorname{grad} f(x^{(k)}) \qquad (2)$$

where α is a parameter (in general, a small positive constant) which determines the rate at which a numerical value is updated once, k is an update count, and grad $f(x^{(k)})$ is the gradient vector of the function f(x) in the kth update processing (which faces in a direction in which the change rate of the function f(x) is maximum).

The gradient vector grad $f(x^{(k)})$ is obtained by the following method. Let $x^{(k)}=(\theta x^{(k)}, \theta y^{(k)}, \theta z^{(k)})^T$ be the vector in the kth update processing. A function $f(x^{(k)}+\Delta x)$ is calculated when minute change amount $\Delta x=(\Delta\theta x, \Delta\theta y, \Delta\theta z)$ is given to each element of the vector $x^{(k)}$.

When the change amount $\Delta x$ is changed to evenly change the direction of the vector in the parameter space, $f(x^{(k)}+\Delta x)$ corresponding to each amount $\Delta x$ is calculated. From a set of calculated $f(x^{(k)}+\Delta x)$, $\Delta x$ ($\Delta x_{MAX}$) which maximizes $f(x^{(k)})-f(x^{(k)}+\Delta x)$ is obtained. Note that $\Delta x_{MAX}$ is a directional vector in the parameter space which maximizes the rate of change of $f(x^{(k)})$, and is equal to grad $f(x^{(k)})$.

In addition, as an optimization algorithm, any known method such as the Newton method may be used. This makes it possible to estimate a rotational angle that gives an optimal evaluation value with a smaller repetition count and speed up the processing.

(Modification 2)

In the above estimation processing (step S608) of rigidity transformation, a similarity with internal information depicted in the infrared camera is used as an evaluation value for evaluating the appropriateness of rigidity transformation of the MRI image. However, an evaluation value may be obtained by other methods.

For example, the shape residual difference between the contour (silhouette) shape of the subject depicted in the body surface neighboring MIP image generated from the MRI image and the contour shape of the subject depicted in the infrared camera may be calculated, and used as an evaluation value.

That is, in step S907, the two-dimensional breast shape as a subject is extracted from each of a body surface neighboring MIP image $I_{D\_MIPonC1}k$ and the infrared camera image $I'_{CAM1}$, and the residual difference between the two-dimensional breast shapes is used as the evaluation value Ek. In this case, in the body surface neighboring MIP image $I_{D\_MIPonC1}k$, an area outside the breast has lower luminance and an area inside the breast has higher luminance, and thus the boundary between the areas is clear, similarly to the MRI image as a generation source. Therefore, the breast shape can be extracted from the body surface neighboring MIP image $I_{D\_MIPonC1}k$ by the same method as that of obtaining the surface shape from the MRI image in step S602. In addition, the breast shape can be extracted from the infrared camera image $I'_{CAM1}$ by the same method as the breast contour shape extraction method in step S606. The evaluation value Ek can be calculated by the same method as that of calculating, in step S1206, the residual difference Rk in breast shape between the deformed MRI image and the infrared camera image in a held state.

This makes it possible to perform rigidity transformation processing of the MRI image without using internal information depicted in the infrared camera or even by using a general camera which depicts no internal information of the subject. In addition, since the residual difference Rk calculated in step S1206 can be calculated using a general camera instead of the infrared camera, the infrared camera can be replaced by a general camera throughout the overall processing. A portion except for a breast with no superficial vessel can be an object.

Note that a value obtained by combining the similarity with the internal information depicted in the infrared camera and a contour shape error may be used as an evaluation value. This evaluation value can be calculated as in step S1206 by replacing the similarity $S_{MRI}k$ in step S1206 by the similarity with the internal information depicted in the infrared camera and the residual difference Rk by the shape residual difference in contour shape.

(Modification 3)

In the above estimation processing (step S609) of compression deformation, a similarity with a PAT image and a shape error with respect to the contour (silhouette) of the subject depicted in the infrared camera are used as evaluation values for evaluating the appropriateness of compression deformation of the MRI image. However, evaluation values may be obtained by other methods.

For example, a deformed MRI image is generated based on a deformed mesh. A body surface neighboring MIP image after deformation may be generated by projecting the deformed MRI image from the viewpoint of the infrared camera. The similarity between the body surface neighboring MIP image and an infrared camera image may be calculated and added to an evaluation value.

That is, in step S1205, the deformation function Fk representing the displacement of each node from the mesh M to the deformed mesh DMk is generated. Rigidity transformation using the coordinate transformation matrix $T_{MtoC1}$ from the MRI image coordinate system $C_{MRI}$ to the front camera apparatus coordinate system $C_{CAM1}$ is performed for the MRI image, and the resultant image is deformed using the deformation function Fk, thereby generating the deformed MRI image $I_{D\_MRIonC1}k$.

Subsequently, the body surface neighboring deformed MIP image $I_{D\_MIPonC1}k$ using the neighborhood information of a surface area is generated from the deformed MRI image $I_{D\_MRIonC1}k$ by the same method as that used in steps S905 and S906. A similarity $S_{MIP}k$ between the body surface neighboring MIP image $I_{D\_MIPonC1}k$ and the infrared camera image $I'_{CAM1}$ in a held state is then calculated. Lastly, the evaluation value Ek as the weighted sum of the similarity $S_{MRI}k$, the residual difference Rk, and the calculated similarity $S_{MIP}k$ is calculated in step S1206, as given by:

$$Ek=aS_{MRI}k+b\{1/(1+Rk)\}+cS_{MIP}k \qquad (3)$$

where a, b, and c are weight coefficients (a+b+c=1).

This makes it possible to obtain a deformation parameter by further using the information of a superficial vessel near the body surface and perform accurate alignment.

(Modification 4)

The case in which a superficial vessel is visualized by using infrared camera images obtained by near-infrared light has been described above. For example, it is also possible to use an image visualizing a superficial vessel using polarization components obtained by internal reflection in the body. For example, the body surface is irradiated with light such as halogen light. Surface reflection components reflected by the body surface are then discriminated from internal reflection components which temporarily enter the body and exit from the body surface after being absorbed and scattered inside the body. With this processing, an image visualizing information inside the body is obtained. In this image, like the infrared camera image, among the internal reflection components, components corresponding to the hemoglobin-absorbed portion of the interior of a blood vessel are depicted darker than the surroundings.

In this manner, a three-dimensional image obtained by imaging an object using the first imaging apparatus and a two-dimensional image obtained by imaging the surface of the object using the second imaging apparatus are obtained, and information indicating the surface position of the object is obtained from the three-dimensional image. A projected image obtained when seeing the three-dimensional image from the viewpoint of the second imaging apparatus is generated based on the information indicating the surface position. The three-dimensional image is aligned with the two-dimensional image with respect to the object by using the projected image and the two-dimensional image.

That is, the image processing apparatus of this embodiment includes the image obtaining units 101, 103, and 104 which obtain the first image by imaging an object using the first imaging apparatus (for example, an MRI or CT apparatus), the second image by imaging the object using the second imaging apparatus 120 different from the first imaging apparatus, and the third images by imaging the object using the image capturing units 305, 306, and 307 whose positional relationships with the second imaging apparatus are associated with each other, and the alignment unit 113 which aligns the first image with the second image using the result of comparing the first image with the third images. This makes it possible to accurately align a three-dimensional image such as an MRI image or CT image of a subject as an object with a PAT image.

Second Embodiment

Image processing according to the second embodiment of the present invention will be described below. Note that the same reference numerals as in the first embodiment denote the same components in the second embodiment, and a detailed description thereof will be omitted.

The first embodiment has exemplified the method of obtaining a rigidity transformation parameter between an image of a subject in an unheld state and an MRI image (performing alignment in an unheld state) and then estimating a deformation parameter between an image of the subject in a held state and the MRI image (estimating compression deformation). This method can include an error caused when a subject in an unheld state differs in shape from a subject in an MRI image or an error caused by the fine motion of the subject when it shifts from an unheld state to a held state.

The second embodiment will exemplify a method of simultaneously estimating a rigidity transformation parameter and a deformation parameter between an image of a subject in a held state (a subject in the second state) and an MRI image (the subject in the first state) without using measurement information concerning the subject in an upheld state.

Figure 16:
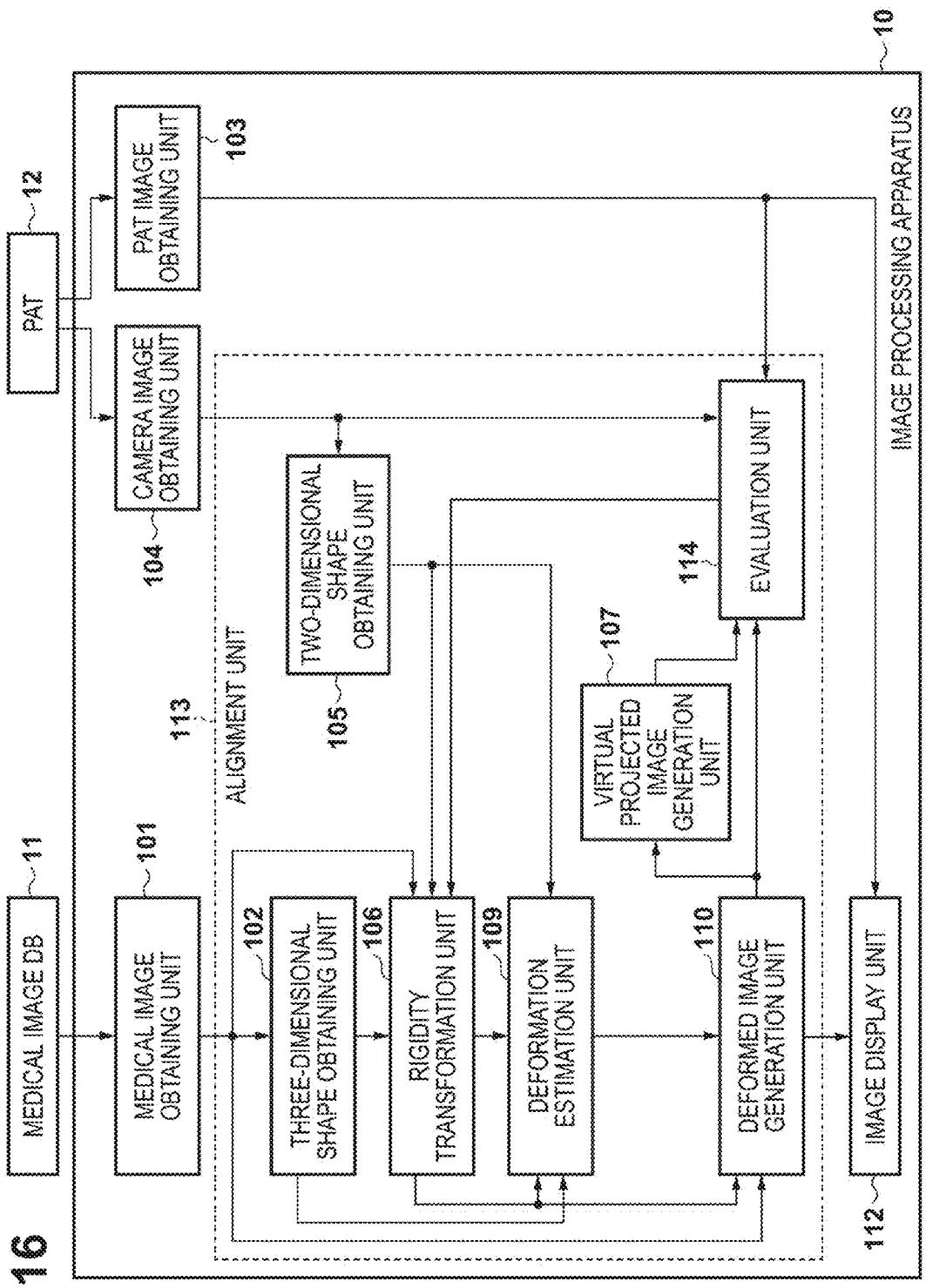
FIG. 16 is a block diagram showing an example of the arrangement of a modality including an image processing apparatus according to the second embodiment.

FIG. 16 is a block diagram showing an example of the arrangement of a modality system including an image processing apparatus 10 according to the second embodiment. This arrangement differs from that in the first embodiment shown in FIG. 1 in that it includes an evaluation unit 114 in place of the virtual projected image evaluation unit 108 and the deformed image evaluation unit 111 in the first embodiment. In addition, the flow of information in an alignment unit 113 in the second embodiment differs from that in the first embodiment. This point will be described in detail in the description of the operation and processing of each unit.

Figure 17:
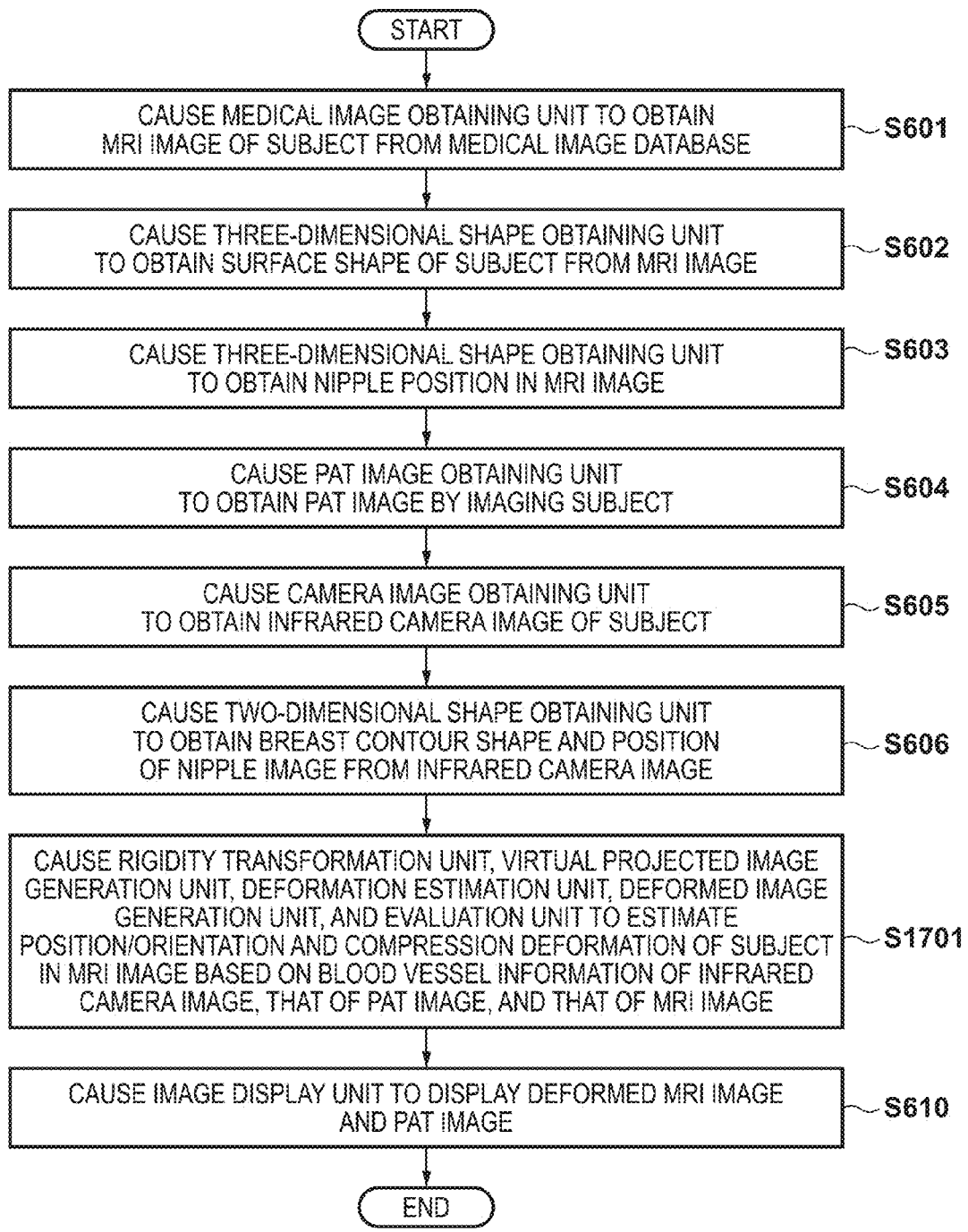
FIG. 17 is a flowchart for explaining a processing procedure by the image processing apparatus according to the second embodiment.

The operation and processing of each unit of the image processing apparatus 10 according to the second embodiment will be described with reference to the flowchart of FIG. 17. Note that operations and processes in steps S601 to S606 and S610 are the same as those in the first embodiment, and a detailed description thereof will be omitted.

In step S1701, the position/orientation and compression deformation of a subject in an MRI image are estimated based on the blood vessel information of an infrared camera image, that of a PAT image, and that of an MRI image. This processing is performed by a rigidity transformation unit 106, a virtual projected image generation unit 107, a deformation estimation unit 109, a deformed image generation unit 110, and the evaluation unit 114.

In the second embodiment, the position/orientation of a subject on an MRI image with respect to an infrared camera and a deformation parameter representing the compression deformation of the subject are alignment parameters. The deformed image generation unit 110 coordinate-transforms an MRI image to the infrared camera coordinate system (front camera coordinate system) based on candidate values of hypothesized alignment parameters, and performs compression deformation for the image, thereby generating a deformed MRI image based on the candidate values of the alignment parameters.

The virtual projected image generation unit 107 generates an MIP image by performing perspective projection for the generated deformed MRI image with reference to the viewpoint of the infrared camera. At this time, the virtual projected image generation unit 107 generates an MIP image with an enhanced superficial vessel in the breast by visualizing only the luminance information of an area near the three-dimensional surface of the breast on each projection line from the viewpoint of the infrared camera or performing image processing so as to visualize the luminance information while enhancing it.

The rigidity transformation unit 106 coordinate-transforms the deformed MRI image from the infrared camera coordinate system (front camera coordinate system) to the PAT image coordinate system based on the position/orientation of the infrared camera calibrated in advance with respect to a PAT 12.

Subsequently, the evaluation unit 114 calculates the similarity between the MIP image and the infrared camera image visualizing blood vessel information and the similarity between the PAT image and the deformed MRI image after coordinate transformation, and calculates an evaluation value by integrating the similarities. The hypothesized alignment parameter is then changed to select an alignment parameter which maximizes the evaluation value. That is, alignment including compression deformation is performed between the MRI image and the PAT image by using the alignment parameter.

Figure 18:
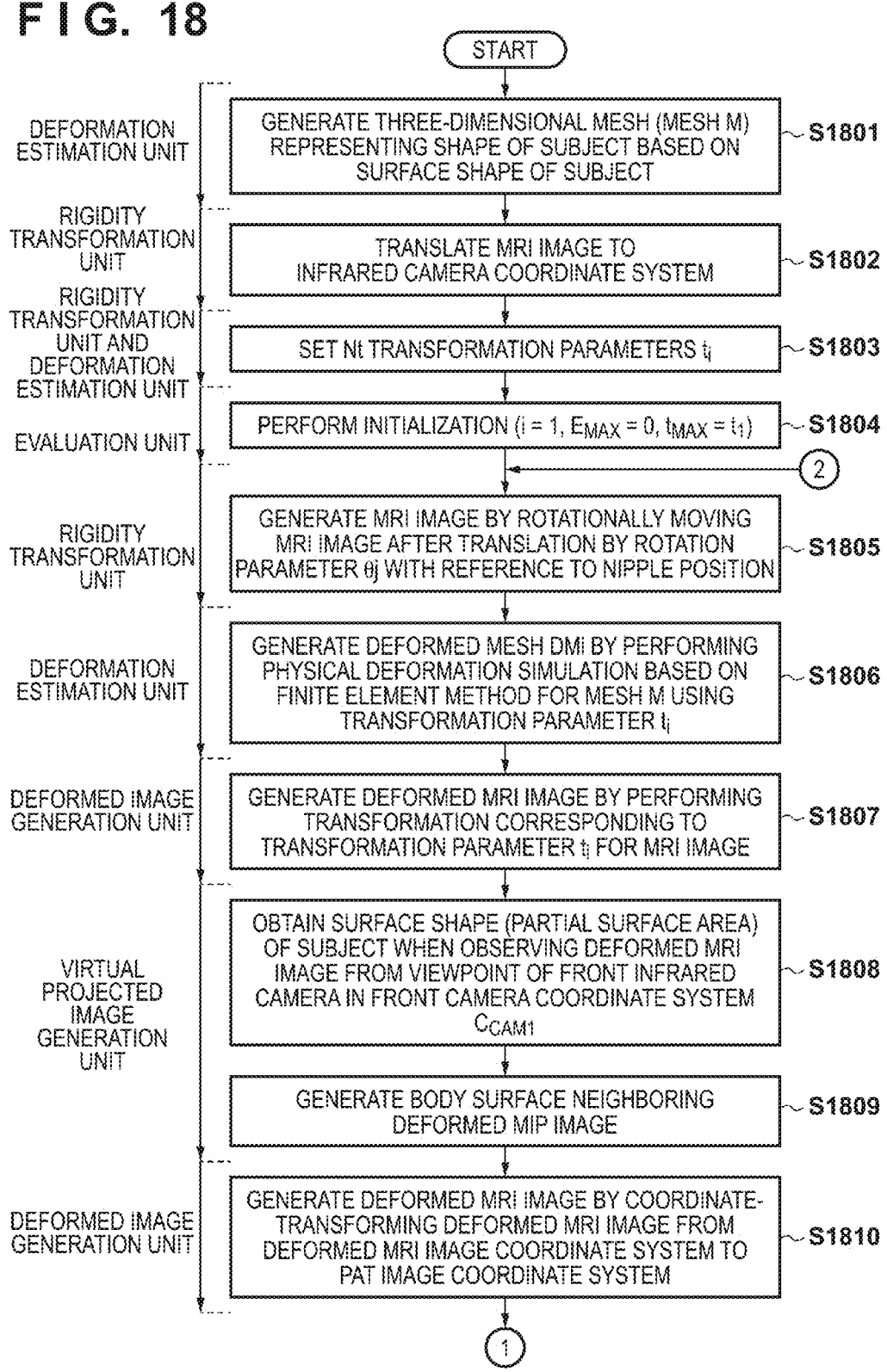
FIG. 18 is a flowchart for explaining the details of estimation of a position/orientation and compression deformation.
Figure 19:
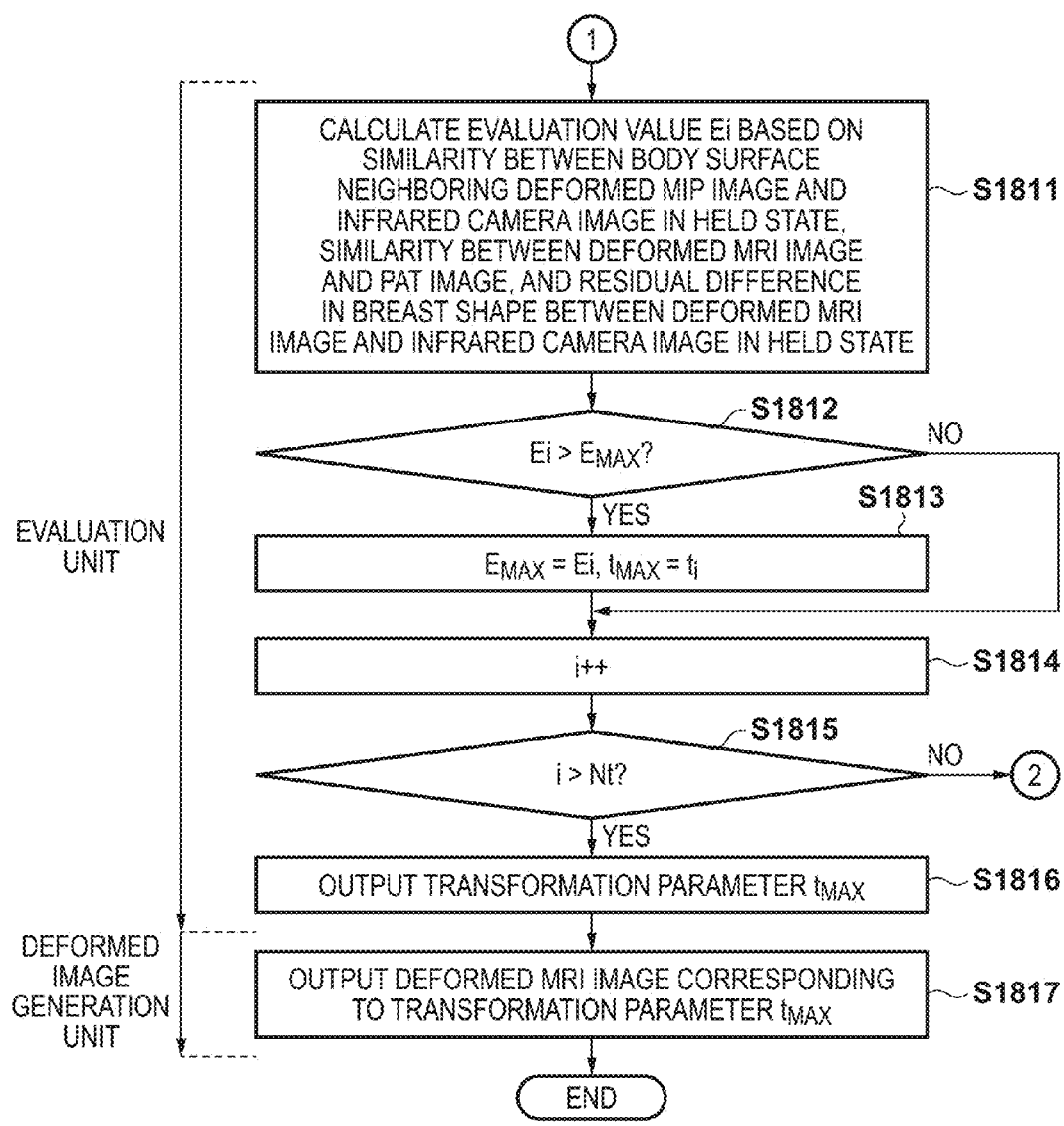
FIG. 19 is a flowchart for explaining the details of the estimation of the position/orientation and compression deformation.

The estimation (step S1701) of the position/orientation and compression deformation will be described in detail with reference to the flowcharts of FIGS. 18 and 19.

In step S1801, the deformation estimation unit 109 generates a mesh M representing the shape of the subject based on the surface shape of the subject obtained in step S602. This processing is the same as that in step S1201 in the first embodiment, and a detailed description thereof will be omitted.

In step S1802, the rigidity transformation unit 106 translates the MRI image to the infrared camera coordinate system. The processing in step S1802 is performed based on the nipple position in the MRI image which is obtained in step S603 and the nipple position on the infrared camera image in a held state which is obtained in step S606. This processing is almost the same as that in step S901 in the first embodiment, and a detailed description thereof will be omitted. Note that the processing in step S901 differs from the processing in step S1802 which is performed based on the infrared camera image in a held state, in that it is performed based on the infrared camera image in an upheld state.

Subsequently, in step S1803, the rigidity transformation unit 106 and the deformation estimation unit 109 set a plurality of (Nt) alignment parameter (transformation parameter) hypotheses $t_i$ (1≤i≤Nt) by combining values which a rigidity transformation parameter can take and values which each component of the deformation parameter can take.

For example, the rigidity transformation unit 106 sets a plurality of ($N_θ$) rotation parameters θj (1≤j≤$N_θ$) as values which the rigidity transformation parameter can take, as in step S902 in the first embodiment. The deformation estimation unit 109 sets a plurality of (Np) deformation parameters $p_k$ (1≤k≤Np) as values which the deformation parameter can take, as in step S1202 in the first embodiment. The rotation parameters θj are combined with the deformation parameters $p_k$ to set a plurality of (Nt=$N_θ$×Np) deformation parameters $t_i$ (1≤i≤Nt). Note that since the relationship between the PAT image coordinate system and the front camera coordinate system is known, this operation is equivalent to setting candidate values of alignment parameters from the MRI image (the subject in the first state) to the PAT image (the subject in the second state). In addition, assume that the transformation parameter $t_i$ is shared between the rigidity transformation unit 106 and the deformation estimation unit 109.

In step S1804, the evaluation unit 114 performs initialization processing. That is, the evaluation unit 114 sets 1 in a loop variable i, 0 in a maximum value $E_{MAX}$ of evaluation values (to be described later), and $t_1$ in a transformation parameter $t_{MAX}$ (to be described later).

In step S1805, the rigidity transformation unit 106 generates an MRI image $I_{MRIonC1}i$ by rotationally moving the MRI image after translation by the transformation parameter $t_i$ (that is, θj) with reference to the nipple position. The rigidity transformation unit 106 then outputs the MRI image $I_{MRIonC1}i$ and a coordinate transformation matrix $T_{MtoC1}i$ to the deformation estimation unit 109 and the deformed image generation unit 110. This processing is almost the same as that in step S904 in the first embodiment, and a detailed description thereof will be omitted.

In step S1806, the deformation estimation unit 109 generates a deformed mesh DMi by performing a physical deformation simulation based on the finite element method for the mesh M using the transformation parameter $t_i$ (that is, θj and $p_k$), and outputs a deformation function Fjk to the deformed image generation unit 110. That is, the deformation estimation unit 109 generates a mesh Mi by performing rigidity transformation corresponding to the rotation parameter θj for the mesh M by using the coordinate transformation matrix $T_{MtoC1}i$ derived in step S1805. The deformation estimation unit 109 then generates the deformed mesh DMi as a mesh after deformation by performing a physical deformation simulation for the mesh Mi. A deformation function Fi(x, y, z) at this time is defined as a displacement vector $di_L$ (1≤L≤Nm) which displaces each node from the mesh M to the deformed mesh DMi. Note that this processing is the same as that in step S1204 in the first embodiment.

In step S1807, the deformed image generation unit 110 generates a deformed MRI image by performing transformation corresponding to the transformation parameter $t_i$ (that is, $θ_j$ and $p_k$) for the MRI image, and outputs the deformed MRI image to the virtual projected image generation unit 107. That is, the deformed image generation unit 110 coordinate-transforms the MRI image to a front camera coordinate system $C_{CAM1}$ corresponding to the rotation parameter θj by performing rigidity transformation for the MRI image using the coordinate transformation matrix $T_{MtoC1}i$. The deformed image generation unit 110 generates a deformed MRI image $I_{D\_MRIonC1}i$ by performing transformation processing using the deformation function Fjk for the MRI image having undergone coordinate transformation.

In step S1808, the virtual projected image generation unit 107 obtains the surface shape (a partial surface area) of the subject expected to enter the field of view when observing the deformed MRI image $I_{D\_MRIonC1}i$ from the viewpoint of a front infrared camera 305 in the front camera coordinate system $C_{CAM1}$. This processing is equivalent to that in step S905 in the first embodiment except that the MRI image having undergone rigidity transformation is replaced by the deformed MRI image $I_{D\_MRIonC1}i$, and a detailed description thereof will be omitted.

In step S1809, the virtual projected image generation unit 107 generates a body surface neighboring deformed MIP image $I_{D\_MIPonC1}i$ using the neighborhood information of a surface area in the deformed MRI image $I_{D\_MRIonC1}i$, and outputs the body surface neighboring deformed MIP image to the evaluation unit 114. This processing is equivalent to that in step S906 in the first embodiment except that the MRI image having undergone rigidity transformation is replaced by the deformed MRI image $I_{D\_MRIonC1}i$, and a detailed description thereof will be omitted.

In step S1810, the deformed image generation unit 110 generates a deformed MRI image $I_{D\_MRIonP}i$ by coordinate-transforming the deformed MRI image $I_{D\_MRIonC1}i$ generated in step S1807 from the front camera coordinate system to the PAT image coordinate system, and outputs the deformed MRI image to the evaluation unit 114. That is, the deformed image generation unit 110 coordinate-transforms the deformed MRI image $I_{D\_MRIonC1}i$ to a PAT apparatus coordinate system $C_{DEV}$ by using a coordinate transformation matrix $T_{C1toD}$. In addition, the deformed image generation unit 110 generates the deformed MRI image $I_{D\_MRIonP}i$ in a PAT image coordinate system $C_{PAT}$ by coordinate transformation using the inverse matrix of a coordinate transformation matrix $T_{PtoD}$.

In step S1811, the evaluation unit 114 calculates a similarity $S_{MIP}i$ (0≤$S_{MIP}i$≤1) between the body surface neighboring deformed MIP image $I_{D\_MIPonC1}i$ and the infrared camera image in a held state, and a similarity $S_{MRI}i$ (0≤$S_{MRI}i$≤1) between the deformed MRI image $I_{D\_MRIonP}i$ and the PAT image. The evaluation unit 114 further calculates a residual difference Ri in breast shape between the deformed MRI image $I_{D\_MRIonP}i$ and the infrared camera image in a held state. The evaluation unit 114 then calculates an evaluation value Ei by integrating these similarities and the residual difference.

The method of calculating the similarity $S_{MIP}i$ is the same as that in step S907 in the first embodiment except that the body surface neighboring MIP image $I_{MIPonC1}j$ and the infrared camera image in an upheld state are replaced by the body surface neighboring deformed MIP image $I_{D\_MIPonC1}i$ and the infrared camera image in a held state. In addition, the method of calculating the similarity $S_{MRI}i$ is the same as that in step S1206 in the first embodiment except that the deformed MRI image $I_{D\_MRI}k$ is replaced by the deformed MRI image $I_{D\_MRIonP}i$. The evaluation unit 114 calculates the residual difference Ri as the difference between the contour (silhouette) shape of the subject depicted in the infrared camera image and the external shape of a deformed mesh DMjk projected on the infrared camera image. The method of obtaining the residual difference Ri is the same as that in step S1206.

The evaluation value Ek is expressed as, for example, the weighted sum of the similarities $S_{MIP}i$ and $S_{MRI}i$ and the residual difference Ri by:

$$Ei = aS_{MIP}i + bS_{MRI}i + c\{1/(1+Ri)\} \quad (4)$$

where a, b, and c are weight coefficients (a+b+c=1).

In addition, the third term of equation (4) uses the reciprocal of (1+Rk) for the same reason as that in step S1206.

In step S1812, the evaluation unit 114 then compares the evaluation value Ei with the maximum value $E_{MAX}$ of evaluation values.

If the evaluation value Ei exceeds the maximum value $E_{MAX}$ of evaluation values (Ei>$E_{MAX}$) (YES in step S1812), the evaluation unit 114 advances the process to step S1813.

In step S1813, the evaluation unit 114 updates the maximum value $E_{MAX}$ ($E_{MAX}$=Ei). The evaluation unit 114 also updates a transformation parameter $t_{MAX}$ corresponding to the maximum value $E_{MAX}$ ($t_{MAX}$=$t_i$).

On the other hand, if it is determined in the comparison processing in step S1812 that the evaluation value Ei is equal to or less than the maximum value $E_{MAX}$ of evaluation values (Ei≤$E_{MAX}$) (NO in step S1812), the evaluation unit 114 advances the process to step S1814 without performing updating in step S1813.

In step S1814, the evaluation unit 114 increments the loop variable i. In step S1815, the evaluation unit 114 compares the loop variable i with a total number Nt of hypotheses. If the loop variable i is equal to or less than the total number Nt of hypotheses (i≤Nt) (NO in step S1815), the evaluation unit 114 returns the process to step S1805. On the other hand, if it is determined in the comparison processing in step S1815 that the loop variable i exceeds the total number Nt of hypotheses (i>Nt) (YES in step S1815), the evaluation unit 114 advances the process to step S1816. That is, the processing from step S1805 to step S1815 is repeated by the total number Nt of hypotheses.

When the processing corresponding to the total number Nt of hypotheses is complete, the evaluation unit 114 outputs, in step S1816, the transformation parameter $t_{MAX}$ (that is, $\theta_{MAX}$ and $p_{MAX}$) corresponding to the maximum value $E_{MAX}$ of evaluation values to the deformed image generation unit 110. In other words, the transformation parameter $t_{MAX}$ corresponding to the maximum value $E_{MAX}$ of evaluation values is selected from the plurality of transformation parameters.

In step S1817, the deformed image generation unit 110 outputs the deformed MRI image $I_{D\_MRIonP}$ corresponding to the transformation parameter $t_{MAX}$ to the image display unit 112.

With the above operation, the estimation (step S1701) of the position/orientation and compression deformation by the rigidity transformation unit 106, the virtual projected image generation unit 107, the deformation estimation unit 109, the deformed image generation unit 110, and the evaluation unit 114 is terminated. According to this processing, the deformed MRI image $I_{D\_MRIonP}$ is generated by the transformation parameter $t_{MAX}$ which maximizes the evaluation value Ei for the appropriateness of deformation among the results of performing transformation including compression deformation by hypothesizing the transformation parameters $t_i$ representing various types of rotation and deformation.

The position/orientation and compression deformation of the subject on the MRI image are estimated by comparing the blood vessel information of the MIP image with an enhanced superficial vessel which is generated by compressing and deforming the MRI image, that of the infrared camera image in a held state, and that of the PAT image. This makes it possible to implement accurate deformation alignment even when an ideal infrared camera image in an unheld state has not been captured at the time of capturing a PAT image or when the position/orientation of the breast changes during a shift from an unheld state to a held state.

(Modification)

The above processing has exemplified the case in which the evaluation value Ei is used, while incorporating the blood vessel information of the PAT image and that of the infrared camera image. However, there is no need to simultaneously use these pieces of information. For example, deformation alignment may be executed by using the blood vessel information of the PAT image first and then using the blood vessel information of the infrared camera image.

For example, the transformation parameter $t_i$ is changed, and the similarity between the deformed MRI image and the PAT image is evaluated, thereby obtaining the transformation parameter $t_{MAX}$ which maximizes the evaluation value. The transformation parameter $t_i$ is then changed under limitation to near the transformation parameter $t_{MAX}$ to evaluate the similarity between the body surface neighboring deformed MIP image $I_{MIPonC1}i$ and the infrared camera image, thereby obtaining a transformation parameter $t_{MAX2}$ which maximizes the evaluation value. The deformed MRI image corresponding to the transformation parameter $t_{MAX2}$ is set as a compression deformation alignment result. With this operation, after coarse deformation alignment using a PAT image depicting rough blood vessel information as a morphological image is executed for an MRI image, it is possible to perform accurate deformation alignment by using an infrared camera image depicting more precise blood vessel information as a functional image.

In addition, as in the first embodiment, after a rigidity transformation parameter in an unheld state is estimated, the setting range of hypotheses of $\theta j$ may be limited to near a rigidity transformation parameter, and a rigidity transformation parameter in a held state and a deformation parameter may be estimated. This can decrease the total number of hypotheses and speed up the processing. Obviously, as in Modification 1 of the first embodiment, a transformation parameter may be obtained by using a general optimization algorithm instead of evaluation by round-robin matching of hypotheses. In this case, it is possible to use a rigidity transformation parameter estimated in an unheld state as the initial value of $\theta j$.

Third Embodiment

Image processing according to the third embodiment of the present invention will be described below. Note that the same reference numerals as in the first and second embodiments denote almost the same components in the third embodiment, and a detailed description thereof will be omitted.

The first and second embodiments have exemplified the case in which the MRI image is aligned with the PAT image based on the captured image of the breast obtained by the infrared camera mounted in the PAT 12 and the MIP image with an enhanced superficial vessel in the breast which is generated from the MRI image. However, a target image for alignment with a three-dimensional image using a three-dimensional image of a subject captured in advance, such as an MRI image, and the information of a superficial vessel in the subject which is depicted in the infrared camera is not limited to a PAT image.

For example, an image of a slice (to be referred to as a "corresponding slice" hereinafter) corresponding to an imaging slice of an ultrasonic image is generated (clipped) from a CT image or MRI image as a three-dimensional image to be presented for the purpose of diagnosis support.

The third embodiment will exemplify a case in which a subject at the time of capturing an MRI image is aligned with a subject at the time of capturing an ultrasonic image based on an ultrasonic image, captured images of the subject obtained by infrared cameras whose positional relationships are associated with each other in advance, and an MIP image with an enhanced superficial vessel in the subject which is generated from an MRI image. In the following description, when a breast is a subject, the subject at the time of capturing an MRI image and the subject at the time of capturing an ultrasonic image are sometimes called the "subject in the first state" and the "subject in the second state", respectively.

In addition, in the third embodiment, the MRI image captured in advance is the image obtained by imaging the breast in a prone position as the subject in the first state, and the ultrasonic image is the image obtained by imaging the breast in the supine position as the subject in the second state. In order to perform alignment between the MRI image and the ultrasonic image, therefore, it is necessary to estimate not only rigidity transformation between the two images but also gravitational deformation. A processing procedure in the third embodiment will be described below.

An ultrasonic probe mounted in an ultrasonic imaging apparatus is brought into contact with a subject in a supine position to capture an ultrasonic image. The ultrasonic probe is attached with a sensor (magnetic system, optical system, or the like) which measures the position/orientation of the probe. This sensor measures the position/orientation of the ultrasonic probe during the execution of ultrasonic imaging. That is, the sensor measures the imaging area of an ultrasonic image in a coordinate system (to be referred to as a sensor coordinate system hereinafter) as a reference.

In addition, the position/orientation of the infrared camera mounted to image the subject is calibrated in the sensor coordinate system. It is therefore possible to associate an ultrasonic image with the position/orientation of an infrared camera image via the sensor coordinate system. An infrared camera image which is captured by the infrared camera and in which a superficial vessel of a breast in a supine position is depicted is obtained.

As in the first and second embodiments, a three-dimensional surface shape of the breast is extracted from the MRI image obtained by imaging the subject. Subsequently, candidate values of alignment parameters which represent various positions/orientations and gravitational deformations of the subject on the MRI image with respect to the infrared camera are hypothesized, and a deformed MRI image having undergone gravitational deformation and alignment is generated for each of the candidate values of the alignment parameters.

An MIP image with an enhanced superficial vessel on the infrared camera side is generated by using body surface neighborhood information in each deformed MRI image. Subsequently, the position/orientation and gravitational deformation of the subject on the MRI image with respect to the infrared camera which maximize the similarity between each MIP image and a corresponding infrared camera image are estimated.

Based on the position/orientation of the infrared camera image corresponding to the ultrasonic image which is associated in advance, a deformed MRI image is generated by deformation alignment of the MRI image with the coordinate system of the ultrasonic image, and deformation alignment is then performed between the deformed MRI image and the ultrasonic image.

As described above, it is possible to estimate the position/orientation and gravitational deformation of the subject on the MRI image with respect to the infrared camera by comparing the infrared camera image in the supine position with the MIP image with the enhanced superficial vessel on the infrared camera side, which is obtained by performing gravitational deformation for the MRI image. This makes it possible to implement accurate deformation alignment between the infrared camera and an MRI image and to perform accurate deformation alignment between an ultrasonic image and the MRI image by using the positional relationship between the ultrasonic image and the infrared camera.

(Modification 1)

In the third embodiment, in order to correct the deformed state of the breast between the MRI image captured in a prone position and the ultrasonic image captured in a supine position, the gravitational deformation is estimated in addition to the position/orientation of the subject on the MRI image with respect to the infrared camera.

If, however, a three-dimensional image such as a CT image or MRI image to be aligned with an ultrasonic image has been captured in the same supine position as that of the ultrasonic image, there is no need to perform any correction by gravitational deformation between the two images. Processing in this case will be described concerning only the difference (alignment of the subject in the first state on an MRI image with the subject in the second state in the infrared camera) from the processing in the third embodiment.

First of all, candidate values of alignment parameters which variously change only the position/orientation of a subject on an MRI image with respect to the infrared camera are hypothesized, and an MIP image with an enhanced superficial vessel is generated by using body surface neighborhood information in the MRI image for each hypothesized position/orientation.

The similarity between each generated MIP image and a corresponding infrared camera image is evaluated to estimate the position/orientation of the subject on the MRI image with respect to the infrared camera, which maximizes the evaluation value. This makes it possible to perform accurate rigidity alignment between an ultrasonic image and a three-dimensional image to be aligned, when the subject can be regarded as a rigid body.

(Modification 2)

The third embodiment has described the case in which a three-dimensional image of a subject such as an MRI image is aligned with a two-dimensional ultrasonic image obtained by the ultrasonic probe measured by a position/orientation sensor, by using an infrared camera image.

A target to be aligned with a three-dimensional image of a subject may be, for example, a two-dimensional PAT image which is obtained by the ultrasonic probe measured by the position/orientation sensor, similarly to the ultrasonic image. By providing a near-infrared light source in the ultrasonic probe, a two-dimensional PAT image is obtained with the same arrangement as that for an ultrasonic image except that the human body is irradiated with near-infrared light instead of ultrasonic waves. Therefore, the position/orientation and gravitational deformation of the subject on an MRI image with respect to the infrared camera are estimated, similarly to the third embodiment. It is then possible to perform accurate deformation alignment between a two-dimensional PAT image and an MRI image by using the positional relationship between the two-dimensional PAT image and the infrared camera, which is known from the position/orientation sensor.

Fourth Embodiment

Image processing according to the fourth embodiment of the present invention will be described below. Note that the same reference numerals as in the first to third embodiments denote almost the same components in the fourth embodiment, and a detailed description thereof will be omitted.

In the first to third embodiments, the first processing is to estimate the position/orientation and deformed state of a three-dimensional image of a subject, such as an MRI image captured in advance, with respect to the infrared camera. The second processing is to align the three-dimensional image with a target modality by using the positional relationship between the target modality and the infrared camera.

However, only the first processing may be executed. That is, processing to be executed may only estimate the position/orientation and deformation of a three-dimensional image, captured in advance, of a subject in the first state with respect to the subject imaged by the infrared camera, by using the information of a superficial vessel depicted in each of the two images, that is, the infrared camera image and a three-dimensional image, captured in advance, of the subject in the second state.

Estimating the above position/orientation and deformation can align a three-dimensional image of the subject such as an MRI image or CT image captured in advance with the infrared camera which images the object during, for example, a surgical operation on the subject. This makes it possible to refer to a lesion or the like depicted in a three-dimensional image in association with the subject under surgical operation.

As described above, it is possible to provide a mechanism of accurately and automatically aligning a three-dimensional image such as an MRI image or CT image with a subject by using a two-dimensional image captured by the infrared camera and the information of an internal structure near the surface of the subject, which is obtained from the three-dimensional image.

Fifth Embodiment

Image processing according to the fifth embodiment of the present invention will be described below. Note that the same reference numerals as in the first to third embodiments denote almost the same components in the fifth embodiment, and a detailed description thereof will be omitted.

In the first to third embodiments, a three-dimensional image of the subject such as an MRI image captured in advance is aligned with the target modality by estimating the position/orientation and deformed state of the three-dimensional image with respect to the infrared camera (a general camera may also be used) whose position is associated with the target modality.

An image capturing unit whose position is associated with a target modality (in this embodiment, a PAT image) may be a distance image camera which obtains a distance image of a subject. This makes it possible to obtain a three-dimensional shape of the subject by obtaining a distance image of the subject, in contrast to the first to third embodiments in which the two-dimensional shape of the subject can be obtained from the camera image. It is then possible to estimate the position/orientation and deformed state of the MRI image with respect to the distance image camera by comparing the obtained three-dimensional shape of the subject with the three-dimensional shape of the subject depicted in a three-dimensional image (in this embodiment, an MRI image) captured in advance. The MRI image can be finally aligned with the PAT image by using the correspondence between the position of the distance image camera and that of a PAT apparatus. Functional components and a processing procedure according to the fifth embodiment will be described below.

The functional components and processing procedure according to the fifth embodiment are the same as those shown in FIGS. 1 and 6 in the first embodiment except that the infrared camera is replaced by the distance image camera. Therefore, a description of common functional components and processing procedure will be omitted, and only the difference will be explained. The functional components will be described first.

The distance image camera measures, for each pixel (for each portion of a scene depicted in each pixel), the distance to each point in the scene captured as an image by the camera, and generates a distance image having, as the pixel value of each pixel, information representing the distance. It is possible to capture the three-dimensional shape of the surface of an object as a distance image by measuring the object using the distance image camera. Note that the distance image camera used in this embodiment may be based on any known method such as a time-of-flight method or pattern projection method.

In this embodiment, the camera image obtaining unit 104 is replaced by a component (defined as a distance image obtaining unit) having a function of obtaining a distance image.

In this embodiment, the two-dimensional shape obtaining unit 105 is replaced by a component (defined as a shape obtaining unit) having a function of obtaining the three-dimensional shape of a subject from a distance image.

In this embodiment, the virtual projected image generation unit 107 and the virtual projected image evaluation unit 108 are replaced by a component (defined as the first evaluation unit) having a function of comparing the three-dimensional shape of the subject obtained from an MRI image with that of the subject obtained from a distance image obtained by imaging the subject in an unheld state.

In this embodiment, the deformed image evaluation unit 111 is replaced by a function (the second evaluation unit) of comparing the three-dimensional shape of the subject obtained from a deformed MRI image with that of the subject obtained from a distance image obtained by imaging the subject in a held state.

The processing procedure will now be described.

In this embodiment, step S605 is replaced by processing in which the distance image obtaining unit obtains distance images by imaging the subject in an unheld state and a held state.

In this embodiment, step S606 is replaced by processing in which the shape obtaining unit obtains the three-dimensional shape and nipple position of a breast as a subject from a distance image of the breast in an unheld state, which has been obtained in step S605. As for obtaining of the three-dimensional shape of the subject, for example, a difference image between a distance image depicting the subject and that depicting no subject is generated, and an area of the difference image where a value is smaller than a predetermined value can be determined as an area (background area) except for the subject and deleted, thereby obtaining distance data in the subject area, that is, the three-dimensional shape of the subject. Note that the nipple position can be obtained by calculating the curvature of the three-dimensional shape, and detecting a feature point, similarly to step S602.

In this embodiment, step S607 is replaced by processing in which a rigidity transformation unit 106 and the first evaluation unit compare the three-dimensional shape and nipple position of the breast depicted in the MRI image, which have been obtained in steps S602 and S603, with the three-dimensional shape and nipple position of the breast in an unheld state depicted in the distance image, which have been obtained in step S606, and estimate rigidity transformation which match the three-dimensional shapes most. More specifically, the rigidity transformation unit 106 calculates a coordinate transformation matrix representing translation so that the three-dimensional nipple position obtained in step S603 on the MRI image coincides with that obtained in step S606 on the distance image. The first evaluation unit then calculates the residual difference in three-dimensional shape between the MRI image and the distance image by applying the transformation matrix representing translation to the three-dimensional shape on the MRI image to make the nipple positions coincide with each other. The rigidity transformation unit 106 searches for a coordinate transformation matrix for rotational movement which minimizes the residual difference, and performs calculation, thereby calculating a coordinate transformation matrix for rigidity transformation by combining translation and rotational movement.

In this embodiment, step S609 is replaced by processing in which a deformation estimation unit 109, a deformed image generation unit 110, and the second evaluation unit compare the three-dimensional shape of the breast obtained from a deformed MRI image obtained by deforming the MRI image with the three-dimensional shape of the breast in a held state depicted in the distance image, which has been obtained in step S606, and estimate deformation which match the three-dimensional shapes most. More specifically, the deformation estimation unit 109 generates a deformed MRI image by deforming the MRI image by the same method as that in step S609 of the first embodiment. The second evaluation unit calculates the residual difference between the three-dimensional shape of the breast obtained from the deformed MRI image by the same method as that in step S602 and the three-dimensional shape of the breast in a held state in the distance image. The deformation estimation unit 109 searches for a deformation parameter which minimizes the residual difference, thereby performing calculation. Note that in this embodiment, a deformation parameter is estimated based on the residual difference in three-dimensional shape. Obviously, similarly to the first embodiment, a deformation parameter may be estimated based on an evaluation value obtained by considering the similarity between the deformed MRI image and a PAT image, in addition to the residual difference.

As described above, as compared with a case in which a two-dimensional shape obtained from a camera image is used, it is possible to perform accurate estimation by estimating the position/orientation and deformed state of an MRI image with respect to a distance image by using the three-dimensional shape of the breast obtained from the distance image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022779, filed Feb. 7, 2014, which is hereby incorporated by reference herein in its entirety.

What is claimed is:

1. An image processing apparatus comprising:
one or more processors; and
at least one memory coupled to the one or more processors, the at least one memory having instructions stored thereon which, when executed by the one or more processors cause the image processing apparatus to:
obtain a first image generated by imaging an object using a first imaging apparatus, a second image generated by imaging the object using a second imaging apparatus, and a third image generated by imaging the object using a third imaging apparatus whose position is associated with the second imaging apparatus, and
align at least one of the first image or the third image so that the first image and the third image are aligned and align, based on an alignment result between the first image and the third image, at least one of the first image or the second image so that the first image and the second image are aligned.

2. The apparatus according to claim 1, wherein
the third imaging apparatus is an infrared camera configured to generate an infrared camera image visualizing a blood vessel area near a surface of the object, and
the aligning is performed by performing comparison of the blood vessel area near the surface of the object between the first image and the infrared camera image.

3. The apparatus according to claim 1, wherein
the third imaging apparatus is a distance image camera configured to image a three-dimensional shape of a surface of the object as a distance image, and the aligning is performed by performing comparison of a three-dimensional surface shape of the object between the first image and the distance image.

4. The apparatus according to claim 1, wherein the first imaging apparatus is an imaging apparatus configured to generate a three-dimensional image of the object as the first image, and
the instructions, when executed by the one or more processors, further cause the image processing apparatus to:
obtain information indicating a surface position of the object from the three-dimensional image, and
generate, based on the information indicating the surface position, a projected image of the three-dimensional image when seen from a viewpoint of the third imaging apparatus,
wherein the aligning includes aligning in at least one of the first image or the second image so that the projected image corresponds to observation information of the object in the third image.

5. The apparatus according to claim 4, wherein the instructions, when executed by the one or more processors, further cause the image processing apparatus to:
deform the first image imaged in a first state into the first image in a second state by using a result of aligning the first image with the third image,
generate the first image deformed from the first state to the second state by using an alignment parameter for aligning the first image with the second image, and
generate a projected image seen from the viewpoint of the third imaging apparatus by using the deformed first image.

6. The apparatus according to claim 5, wherein the alignment parameter includes a parameter representing a position/orientation of the object and deformation of the object.

7. The apparatus according to claim 5, wherein the instructions, when executed by the one or more processors, further cause the image processing apparatus to generate, based on a plurality of candidate values of the alignment parameter, a plurality of first images deformed in the second state.

8. The apparatus according to claim 7, wherein the instructions, when executed by the one or more processors, further cause the image processing apparatus to obtain similarities between the second image and the plurality of first images deformed in the second state,
wherein the aligning is performed by comparing the first images with the second image using the similarities.

9. The apparatus according to claim 8, wherein one alignment parameter is selected from the plurality of candidate values according to evaluation of the similarities.

10. The apparatus according to claim 1, wherein the instructions, when executed by the one or more processors, further cause the image processing apparatus to cause a display unit to display the first image and the second image, which are aligned, side by side or in a superimposed manner.

11. The apparatus according to claim 1, wherein
the second imaging apparatus is configured to irradiate the object with light, detect a photoacoustic signal which is generated by light irradiation, and generate a photoacoustic tomography image as the second image based on the photoacoustic signal, and
the third imaging apparatus includes an infrared camera configured to generate an infrared camera image as the third image by imaging the object with infrared.

12. The apparatus according to claim 11, wherein
the first imaging apparatus is configured to generate the first image as a three-dimensional image,
the second imaging apparatus is configured to generate the photoacoustic tomography image as a three-dimensional image, and
the instructions, when executed by the one or more processors, further cause the image processing apparatus to:
generate a projected image of the first image when seen from a viewpoint of the infrared camera,
align at least one of the projected image of the first image or the infrared camera image so that the projected image of the first image and the infrared camera image are aligned, and
align, based on an alignment result between the projected image of the first image and the infrared camera image, at least one of the first image or the photoacoustic tomography image so that the first image and the photoacoustic tomography image are aligned.

13. The apparatus according to claim 12, wherein
the first imaging apparatus is an MRI apparatus or a CT apparatus.

14. The apparatus according to claim 1, wherein
the first imaging apparatus is configured to generate the first image as a three-dimensional image,
the second imaging apparatus is configured to generate the second image as a three-dimensional image,
the third imaging apparatus is configured to generate the third image as a two-dimensional image, and
the instructions, when executed by the one or more processors, further cause the image processing apparatus to:
generate a projected image of the first image when seen from a viewpoint of the third imaging apparatus,
align at least one of the projected image of the first image or the third image so that the projected image of the first image and the third image are aligned,
generate a projected image of the second image when seen from a viewpoint of the third imaging apparatus, and
align, based on an alignment result between the projected image of the first image and the third image, at least one of the projected image of the first image or the projected image of the second image so that the projected image of the first image and the third image and at least one of the projected image of the first image or the projected image of the second image are aligned.

15. The apparatus according to claim 1, wherein the instructions, when executed by the one or more processors, further cause the image processing apparatus to:
align at least one of the first image or the third image so that observation information of the object in the first image corresponds to observation information of the object in the third image, and
align, based on the alignment result between the first image and the third image, at least one of the first image or the second image.

16. An image processing method, comprising:
obtaining a first image generated by imaging an object using a first imaging apparatus, a second image generated by imaging the object using a second imaging apparatus, and a third image generated by imaging the object using a third imaging apparatus whose position is associated with the second imaging apparatus; and aligning at least one of the first image or the third image so that the first image and the third image are aligned and aligning, based on an alignment result between the first image and the third image, at least one of the first image or the second image so that the first image and the second image are aligned.

17. A non-transitory computer-readable storage medium storing a program for causing a computer to execute an image processing method, the method comprising:
obtaining a first image generated by imaging an object using a first imaging apparatus, a second image generated by imaging the object using a second imaging apparatus, and a third image generated by imaging the object using a third imaging apparatus whose position is associated with the second imaging apparatus; and
aligning at least one of the first image or the third image so that the first image and the third image are aligned and aligning, based on an alignment result between the first image and the third image, at least one of the first image or the second image so that the first image and the second image are aligned.

18. An image processing apparatus comprising:
one or more processors; and
at least one memory coupled to the one or more processors, the at least one memory having instructions stored thereon which, when executed by the one or more processors cause the image processing apparatus to:
obtain a first image generated by imaging an object using a first imaging apparatus, a second image generated by imaging the object using a second imaging apparatus, and a third image generated by imaging the object using a third imaging apparatus whose position is associated with the second imaging apparatus,
calculate a first similarity between the first image and the third image,
calculate a second similarity between the first image and the second image, and
align, based on the first similarity and the second similarity, at least one of the first image or the second image so that the first image and the second image are aligned.

19. The apparatus according to claim 18, wherein
the second imaging apparatus is configured to irradiate the object with light, detect a photoacoustic signal which is generated by light irradiation, and generate a photoacoustic tomography image as the second image based on the photoacoustic signal, and
the third imaging apparatus includes an infrared camera configured to generate an infrared camera image as the third image by imaging the object with infrared.

20. The apparatus according to claim 19, wherein
the first imaging apparatus is configured to generate the first image as a three-dimensional image,
the second imaging apparatus is configured to generate the photoacoustic tomography image as a three-dimensional image, and
the instructions, when executed by the one or more processors, further cause the image processing apparatus to:
generate a projected image of the first image when seen from a viewpoint of the infrared camera, and
calculate the first similarity between the projected image of the first image and the infrared camera image.

21. The apparatus according to claim 20, wherein
the first imaging apparatus is an MRI apparatus or a CT apparatus.

22. The apparatus according to claim 18, wherein
the first imaging apparatus is configured to generate the first image as a three-dimensional image,
the second imaging apparatus is configured to generate the second image as a three-dimensional image,
the third imaging apparatus is configured to generate the third image as a two-dimensional image, and
the instructions, when executed by the one or more processors, further cause the image processing apparatus to:
generate a projected image of the first image when seen from a viewpoint of the third imaging apparatus, and
calculate the first similarity between the projected image of the first image and the third image.

23. An image processing method, comprising:
obtaining a first image generated by imaging an object using a first imaging apparatus, a second image generated by imaging the object using a second imaging apparatus, and a third image generated by imaging the object using a third imaging apparatus whose position is associated with the second imaging apparatus;
calculating a first similarity between the first image and the third image;
calculating a second similarity between the first image and the second image; and
aligning, based on the first similarity and the second similarity, at least one of the first image or the second image so that the first image and the second image are aligned.

24. A non-transitory computer-readable storage medium storing a program for causing a computer to execute an image processing method, the method comprising:
obtaining a first image generated by imaging an object using a first imaging apparatus, a second image generated by imaging the object using a second imaging apparatus, and a third image generated by imaging the object using a third imaging apparatus whose position is associated with the second imaging apparatus;
calculating a first similarity between the first image and the third image;
calculating a second similarity between the first image and the second image; and
aligning, based on the first similarity and the second similarity, at least one of the first image or the second image so that the first image and the second image are aligned.

* * * * *